United States Patent
Yamada et al.

(10) Patent No.: US 6,175,398 B1
(45) Date of Patent: Jan. 16, 2001

(54) AXIAL SYMMETRIC POLARIZING PLATE, METHOD FOR FABRICATING THE SAME, AND LIQUID CRYSTAL DISPLAY DEVICE

(75) Inventors: Nobuaki Yamada, Higashiosaka; Masayuki Okamoto, Taki-gun; Shuichi Kozaki, Nara, all of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 08/677,348

(22) Filed: Jul. 2, 1996

(30) Foreign Application Priority Data

Jul. 5, 1995 (JP) .................................................. 7-170053

(51) Int. Cl.[7] .................................................. G02F 1/1335
(52) U.S. Cl. .................. 349/96; 349/165; 349/74
(58) Field of Search ............... 349/103, 96, 165, 349/183, 193, 74, 86, 99

(56) References Cited

U.S. PATENT DOCUMENTS

| | | | |
|---|---|---|---|
| 5,194,973 | * 3/1993 | Isogai et al. ........................ | 349/165 |
| 5,221,978 | * 6/1993 | Heynderickx et al. ................ | 349/96 |
| 5,434,687 | * 7/1995 | Kawata et al. ...................... | 349/96 |
| 5,473,450 | 12/1995 | Yamada et al. . | |
| 5,667,719 | * 9/1997 | Mortazavi et al. .................. | 349/96 |
| 5,673,092 | * 9/1997 | Horie et al. ......................... | 349/86 |
| 5,706,109 | 1/1998 | Yamada et al. . | |

FOREIGN PATENT DOCUMENTS

| | | |
|---|---|---|
| 0621501 A2 | 10/1994 | (EP) . |
| 60-256120 | 12/1985 | (JP) . |
| 61-502128 | 9/1986 | (JP) . |
| 4-212928 | 8/1992 | (JP) . |
| 4-338923 | 11/1992 | (JP) . |
| 5-27242 | 2/1993 | (JP) . |
| 6-194655 | 7/1994 | (JP) . |
| 6-265902 | 9/1994 | (JP) . |
| 6-301015 | 10/1994 | (JP) . |
| 6-308496 | 11/1994 | (JP) . |
| 6-324337 | 11/1994 | (JP) . |
| 7-114009 | 5/1995 | (JP) . |
| 7-120728 | 5/1995 | (JP) . |
| WO 85/04262 | 9/1985 | (WO) . |

\* cited by examiner

*Primary Examiner*—William L. Sikes
*Assistant Examiner*—Tai V. Duong
(74) *Attorney, Agent, or Firm*—Nixon & Vanderhye P.C.

(57) ABSTRACT

The axial symmetric polarizing plate of this example includes at least one portion where light transmission easy axes are arranged with axial symmetry so that light transmission for incident light is equivalent omnidirectionally in one plane, wherein the axial symmetric polarizing plate contains at least a dichroic dye fixed in a polymer matrix formed of a polymerized liquid crystal material.

7 Claims, 21 Drawing Sheets

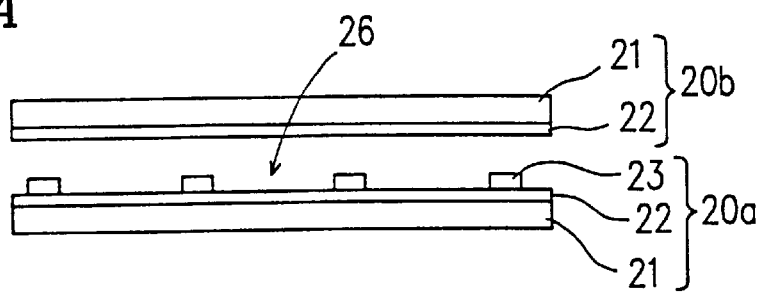
FIG.22A
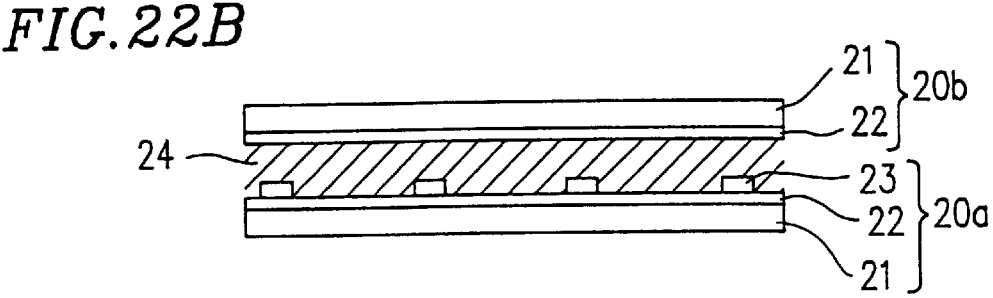
FIG.22B
FIG.22C
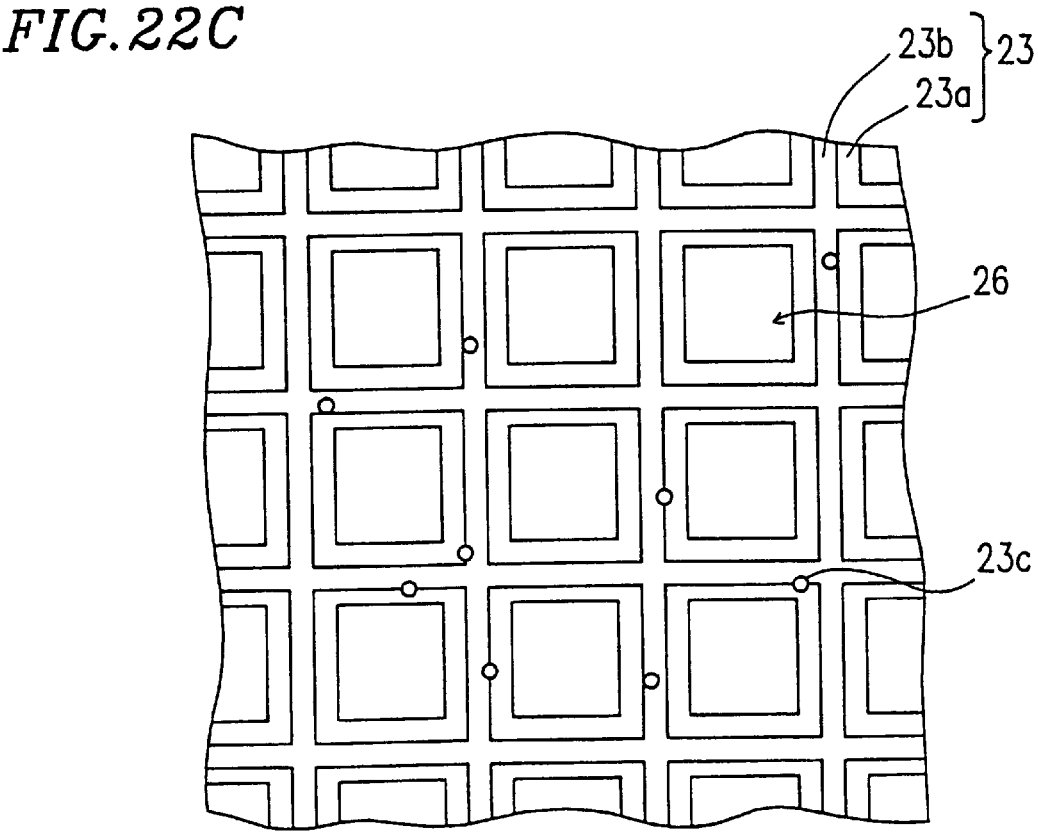

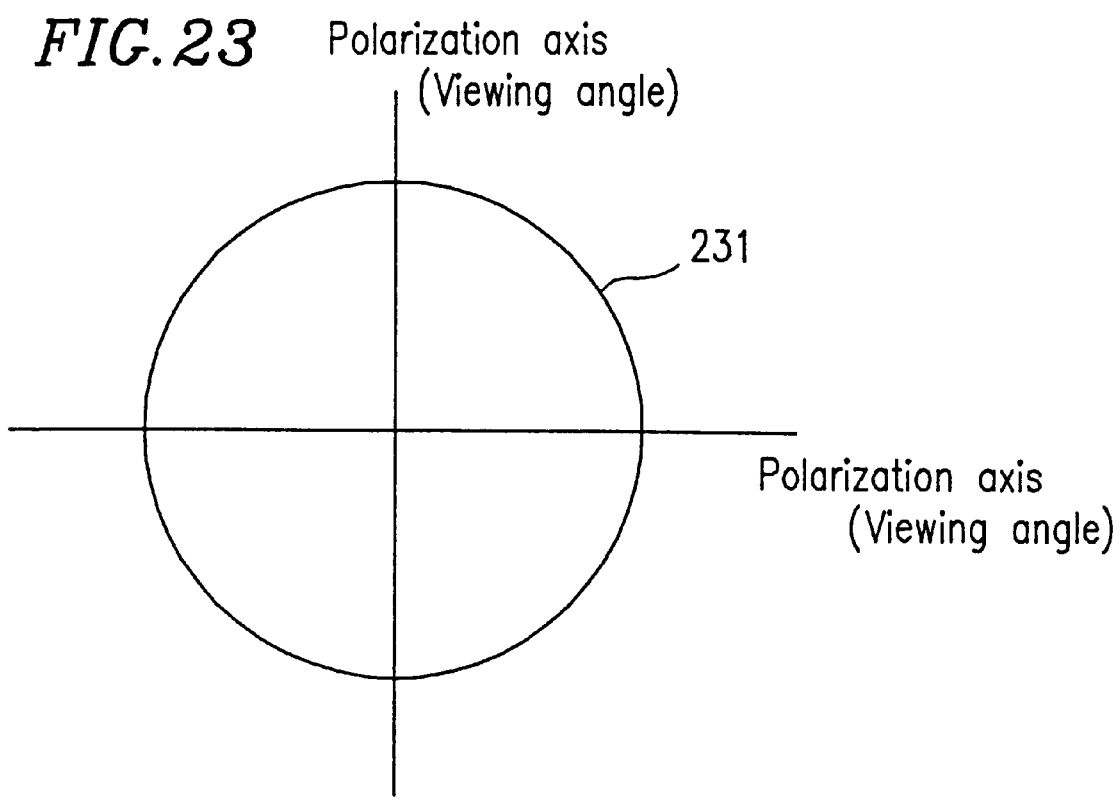

AXIAL SYMMETRIC POLARIZING PLATE, METHOD FOR FABRICATING THE SAME, AND LIQUID CRYSTAL DISPLAY DEVICE

BACKGROUND OF THE INVENTION

1. Field of the Invention

The present invention relates to an axial symmetric polarizing plate, a method for fabricating the axial symmetric polarizing plate, and a liquid crystal display device using the polarizing plate. More Specifically, the present invention relates to an axial symmetric polarizing plate having light transmission easy axes or light absorption axes arranged with axial symmetry so that the light transmission or light absorption of the polarizing plate for incident light is uniform omnidirectionally in one plane, and a method for easy fabrication of such an axis symmetric polarizing plate.

The present invention also relates to a liquid crystal display device where the viewing angle characteristics are uniform omnidirectionally by combining the above axial symmetric polarizing plate and the orientation of liquid crystal molecules of a liquid crystal display device.

2. Description of the Related Art

A liquid crystal display device having wide viewing angle characteristics is suitable, not only for personal display apparatuses such as wordprocessors and personal computers, but also for apparatuses such as portable information terminals which are viewed by a plurality of users, especially one which is viewed by several users gathering in front of the apparatus on a desk. This type of liquid crystal display device should be used both as a reflective liquid crystal device and a portable display device. Such a liquid crystal display device is now under development.

Hereinbelow, the principle for the improvement in the viewing angle characteristics of a liquid crystal display devise will be described.

FIGS. 24A to 24C illustrate the change in the orientation of liquid crystal molecules in a liquid crystal cell where the liquid crystal molecules are oriented in two different directions. FIGS. 24D to 24F illustrate the change in the orientation of liquid crystal molecules in a liquid crystal cell of a conventional twisted nematic (TN) mode, Referring to FIGS. 24A to C, a liquid crystal cell 11 corresponding to one pixel includes upper end lower substrates 2 and 1 facing each other and a liquid crystal layer formed therebetween. The liquid crystal cell 11 has two liquid crystal domains 8a and 8b where liquid crystal molecules 9 are initially oriented in different directions. The liquid crystal domains 8a and 8b are surrounded by a partition 7 made of polymer and the like. The reference numeral 10 denotes the boundary between the liquid crystal domains 8a and 8b. Referring to FIGS. 24D to 24F, a liquid crystal cell 12 corresponding to one pixel is of the TN mode and includes liquid crystal molecules 13 oriented in one direction. Upper and lower polarizing plates (not shown) are disposed on the upper and lower substrates 2 and 1 of both the liquid crystal cells 11 and 12 so that the polarization axes thereof are perpendicular to each other (normally white mode).

In order to improve the viewing angle characteristics of a liquid crystal display device, it is necessary to form two or more domains where liquid crystal molecules are oriented in different directions in each liquid crystal cell corresponding to one pixel as shown in FIGS. 24A to 24C.

The reason is that, as shown in FIG. 24B, in a gray-scale state of the liquid crystal cell 11, i.e., in the state where the liquid crystal molecules are in transition between the horizontal orientation and the vertical orientation by the application of a voltage, the transmittances for light incident from directions A and B are averaged, and thus the same contrast ratio is obtained in the directions A and B. As a result, the viewing angle characteristics of the liquid crystal cell 11 in the gray-scale state are improved compared with that of the liquid crystal cell 12 of the TN mode.

However, in a saturated voltage application state of the liquid crystal cells 11 and 12 (FIGS. 24C and 24F), the liquid crystal molecules 9 and 13 are oriented along the electric field. Therefore, in the saturated voltage application state, the orientations of the liquid crystal molecules are the same in the liquid crystal cells 11 and 12 though they are initially different. In the saturated voltage application state, as for the optical characteristics in a direction inclined from the normal of the liquid crystal display device, a region where the viewing angle characteristics are comparatively poor is generated in the 45° directions from the polarization axes of the upper and lower polarizing plates. This is due to the synergistic effect of the viewing angle characteristics of the upper and lower polarizing plates and the light leakage by an elliptically polarized light component caused by retardation generated as light passes obliquely through the liquid crystal layer. Even a liquid crystal display device, including the liquid crystal cell 11 which has two domains where liquid crystal molecules are oriented in different directions, does not have omnidirectional viewing angle characteristics since the device itself is anisotropic for the viewing angle.

In other words, the problem that the display performance is comparatively poor in 45° directions from the polarization axes of the upper and lower polarizing plates arises because the polarization axes of the polarizing plates are arranged in a predetermined direction over the entire liquid crystal cell.

Next, some examples of conventional liquid crystal display devices of a wide viewing angle mode will be described.

(1) A method for electrically controlling the transparent state or the opaque state of a liquid crystal device using birefringence of liquid crystal molecules in a liquid crystal cell having polymer walls has been proposed. In this method, basically, the ordinary light refractive index of the liquid crystal molecules and the refractive index of a medium supporting the liquid crystal are set to be equal to each other. When a voltage is applied, the liquid crystal molecules become oriented in such a way as to allow the transparent state to be displayed. When no voltage is applied, the liquid crystal molecules become oriented in such a way as to allow the light scattering state to be displayed.

Japanese Laid-Open Patent Publication No. 61-502128 concretely discloses one such method. According to this method, a liquid crystal material and a photocurable or thermosetting resin are mixed. The liquid crystal material is deposited by curing the resin, forming liquid crystal drops in the resin. In this method, neither the polarizing plate nor the alignment treatment for liquid crystal molecules is required.

Japanese Laid-Open Patent Publication Nos. 4-338923 and 4-212928 disclose a wide viewing angle mode where the above liquid crystal device is combined with polarizing plates perpendicular to each other (crossed Nicols state).

More specifically, Japanese Laid-Open Patent Publication No. 4-338923 discloses a liquid crystal display device where a liquid crystal layer of a liquid crystal cell includes a liquid crystal medium, and liquid crystal capsules dispersed in the liquid crystal medium. Two polarizing plates having polarization axes perpendicular to each other are disposed on the opposite surfaces of the liquid crystal cell. A phase plate having a disk shape refractive index anisotropy is formed between the liquid crystal cell and one of the polarizing plates. In this type of liquid crystal display device, display is conducted by switching between whether light is scattered or not scattered by liquid crystal molecules in the liquid crystal capsules. Thus, the viewing angle dependence seldom occurs.

Japanese Laid-Open Patent Publication No. 4-212928 discloses a liquid crystal display device where a liquid crystal panel is constructed so that the orientation of liquid crystal molecules is disordered to scatter incident light when no voltage is applied, and that the incident light is allowed to pass through when a voltage is applied. A pair of polarizing plates having polarizing directions perpendicular to each other are disposed on the opposite surfaces of the liquid crystal panel. A disk shape optical anisotropy film is formed between the liquid crystal panel and one of the polarizing plates.

(2) Japanese Laid-Open Patent Publication No. 5-27242 discloses a method for forming a composite material layer composed of a liquid crystal material and a polymer material as a liquid crystal layer of a liquid crystal cell. The composite material layer is formed by phase separation of the liquid crystal material and the photocurable resin from the mixture thereof. According to this method, the orientation of liquid crystal molecules in liquid crystal domains is disordered by the existence of the resultant polymer portions, and thus the directions in which the liquid crystal molecules in the respective liquid crystal domains rise when a voltage is applied are different. As a result, the apparent refractive indexes observed in different directions are the same, allowing the viewing angle characteristics in the gray-scale state to be improved.

(3) Japanese Laid-Open Patent Publication No. 6-301015 by the inventors of the present invention discloses a liquid crystal display device having significantly improved viewing angle characteristics. In this liquid crystal display device, liquid crystal molecules are aligned uniformly omnidirectionally (spirally, for example) in one pixel region by controlling the intensity of illuminated light using a photomask and the like at photo-polymerization. Such liquid crystal molecules oriented in the spiral shape show substantially the same behavior as liquid crystal molecules of the TN mode in liquid crystal regions having various orientations by controlling them with voltage application. This significantly improves the viewing angle characteristics.

(4) Japanese Laid-Open Patent Publication No. 5-96289 by the inventors of the present invention discloses a liquid crystal display device where alignment films are composed of a crystalline polymer having a spherulite or spherulite-like structure. With this structure, the wide viewing angle display mode is realized since the spherulite structure can control the axial symmetric orientation of liquid crystal molecules through the liquid crystal display.

(5) Japanese Laid-Open Patent Publication No. 6-194655 discloses a method for aligning liquid crystal molecules in random directions using alignment films which are not subjected to any alignment treatment such as rubbing formed on substrates.

(6) Japanese Laid-Open Patent Publication No. 6-265902 discloses a liquid crystal display device where one of substrates of a liquid crystal cell is subjected to alignment treatment so that the orientation of liquid crystal molecules per pixel is concentric, while the other substrate of the liquid crystal cell is subjected to alignment treatment so that the orientation of the liquid crystal molecules is radial. In this liquid crystal display device, the liquid crystal molecules rise symmetrically omnidirectionally when a voltage is applied. The same display quality can be obtained when the display screen is viewed in any direction. The technique disclosed in this publication actually leads to the improvement in the viewing angle characteristics. However, since a pair of polarizing plates of which polarization axes are perpendicular to each other are used, the liquid crystal molecules are oriented along the electric field in the saturated voltage application state. Accordingly, the liquid crystal display device has the anisotropy of the viewing angle characteristics where a region in which the viewing angle characteristics are comparatively poor is generated in the 45° directions from the polarization axes of the polarizing plates.

Next, liquid crystal display devices where the viewing angle characteristics have been improved by the combination of an axial symmetric polarizing plate and the axial symmetric orientation of liquid crystal molecules.

As a method for arranging polarization axes with axial symmetry, Japanese Laid-Open Patent Publication No. 60-256120 discloses a method for infiltrating a dichroic dye into a substrate subjected to rotary rubbing. Japanese Laid-Open Patent Publication No. 6-324337 discloses a method where a dichroic dye is adsorbed by or infiltrated into a substrate along numerous concentric or radial narrow grooves formed on the substrate.

In the above methods, however, the orientation of dichroic dye molecules cannot be significantly controlled by the adsorption, infiltration, and the like, so that the contrast of the polarizing plate is low.

Japanese Laid-Open Patent Publication No. 6-324337 discloses a method where liquid crystal molecules are aligned along narrow grooves formed concentrically or radially on a surface of a substrate which also serves as an axial symmetric polarizing plate as that described above.

In the above method, however, the narrow grooves are not so effective in aligning the liquid crystal molecules compared with the normal rubbing method. Therefore, the orientation of the liquid crystal molecules may be changed by voltage application. Also, since the narrow grooves are formed by lithography, the control of pretilt is difficult. This makes it difficult to reduce disclination (light leakage) generated in the peripheries of pixels.

Next, the improvement in the viewing angle characteristics in the 45° directions using a phase plate will be described.

The reason why the viewing angle characteristics in the 45° directions from the polarization axes of the polarizing plates is that, in these directions, light is observed as elliptically polarized light after it has passed through the liquid crystal layer where liquid crystal molecules are oriented vertically with respect to the liquid crystal cell when a voltage is applied.

In other words, since liquid crystal molecules have refractive index anisotropy (birefringence), light incident obliquely on a surface of the liquid crystal cell passes obliquely through a refractive index ellipsoid of the liquid crystal molecules oriented vertically. As for a light ray passing in a 45° direction from the polarization axis of the polarizing plate, the direction of the major axis of the ellipsoid which is the intersection of the plane of which normal is the optic axis of the light ray and which includes the center of the refractive index ellipsoid and the refractive index is not the same a the direction of the polarization axis of the polarizing plate on the surface of the liquid crystal cell. Moreover, the phases of light propagating along the major axis and minor axis of the ellipsoid are different from each other. Accordingly, light incident in a 45° direction from the polarization axis of the polarizing plate becomes linearly polarized light after passing through the polarizing light on the incident side, and then becomes elliptically polarized light when it passes through the liquid crystal layer, reaching the polarizing plate on the emergent side as the elliptically polarized light. As a result, the transmitted light includes a polarized light component in the direction of the polarization axis of the polarizing plate on the emergent side. Thus, light leakage occurs.

In order to overcome this problem, Japanese Laid-Open Patent Publication No. 4-212928 discloses disposing a phase plate having a disk shape negative anisotropy between the liquid crystal layer and the polarizing plate to compensate the birefringence (refractive index anisotropy) of liquid crystal molecules generated when a voltage is applied.

In this method, however, if the difference in the refractive index between the major-axis direction (z direction) and the minor-axis direction (x and y directions) of liquid crystal molecules is made larger to reduce the birefringence of the liquid crystal molecules, coloring is observed in the viewing angle characteristics when no voltage is applied. This method is therefore not practical. When the birefringence is reduced, the effect of improving the viewing angle is smell.

The above conventional methods have following disadvantages.

(1) In the axial symmetric polarizing plate configured so that the light transmission easy axes or light absorption axes are axial-symmetric (concentric, radial, or spiral) for every pixel, the orientation of the dichroic dye molecules cannot be significantly controlled, so that the contrast as the polarizing plate is low.

In the conventional axial symmetric polarizing plate, polarizing elements with different orientations are required on upper and lower substrates. This increases production cost.

(2) In the liquid crystal display device where concentric or radial narrow grooves are formed for every pixel, and liquid crystal molecules are oriented along the narrow grooves; the pretilt angle cannot be controlled, disclination lines are generated between adjacent pixels when a voltage is applied, and the contrast is lowered.

(3) The above liquid crystal display device is susceptible to an external force, generating display variation when the display screen is pushed, and thus is not suitable as a pen input device.

SUMMARY OF THE INVENTION

The axial symmetric polarizing plate of this example includes at least one portion where light transmission easy axes are arranged with axial symmetry so that light transmission for incident light is equivalent omnidirectionally in one plane, wherein the axial symmetric polarizing plate contains at least a dichroic dye fixed in a polymer matrix formed of a polymerized liquid crystal material.

In one embodiment of the invention, the axial Symmetric polarizing plate includes a plurality of portions, each having light transmission easy axes arranged with axial symmetry and forms one polarizing element, and the plurality of portions are arranged in a regular manner.

According to another aspect of the invention, a liquid crystal display device including the axial symmetric polarizing plate of this invention is provided. In the device, the at least one portion forms at least one polarizing element, and the at least one polarizing element corresponds to a plurality of pixels forming an image display screen.

Alternatively, in the liquid crystal display device including the axial symmetric polarizing plate of this invention, each of the plurality of portions where light transmission easy axes are arranged with axial symmetry form one polarizing element, and a plurality of polarizing elements correspond to one pixel forming an image display screen.

According to still another aspect of the invention, a method for fabricating an axial symmetric polarizing plate including a plurality of portions where light transmission easy axes are arranged with axial symmetry so that light transmission for incident light is equivalent omnidirectionally in One plane is provided. The method includes the steps of: forming a plurality of narrow grooves on at least one of a pair of substrates facing each other with axial symmetry; injecting a mixture containing at least a polymerizable liquid crystal material and a dichroic dye in a space between the pair of substrates so as to allow the polymerizable liquid crystal material to be oriented along the narrow grooves; and curing the polymerizable liquid crystal material while keeping the orientation of the polymerizable liquid crystal material.

Alternatively, the method for fabricating an axial symmetric polarizing plate including a plurality of portions where light transmission easy axes are arranged with axial symmetry so that light transmission for incident light is equivalent omnidirectionally in one plane of this invention includes the steps of: forming partitions on an inner surface of at least one of a pair of substrates each having an electrode on the inner surface for dividing the inner surface into a plurality of regions; injecting a mixture containing at least a polymerizable liquid crystal material and a dichroic dye in a space between the pair of substrates; orienting the polymerizable liquid crystal material so that the light transmission easy axes are arranged with axial symmetry when a voltage is applied between the pair of substrates; and curing the polymerizable liquid crystal material while keeping the orientation of the polymerizable liquid crystal material.

According to another aspect of the invention, a liquid crystal display device including the axial symmetric polarizing plates of this invention disposed on an upper surface and a lower surface of a liquid crystal layer is provided. In the device, the portion of each of the axial symmetric polarizing plates where light transmission easy axes are arranged with axial symmetry forms one polarizing element, the orientations of liquid crystal molecules of the polymerized liquid crystal material are the same in a pair of polarizing elements of the upper and lower axial symmetric polarizing plates opposing each other via the liquid crystal layer, and the dichroic dye contained in one of the axial symmetric polarizing plates is of a p-type, while the dichroic dye contained in the other axial symmetric polarizing plate is of an n-type.

Alternatively, in the liquid crystal display device including the axial symmetric polarizing plates of this invention disposed on an upper surface and a lower surface of a liquid crystal layer, the portion of each of the axial symmetric polarizing plates where light transmission easy axes are arranged with axial symmetry forms one polarizing element. In one of a pair of polarizing elements of the upper and lower axial symmetric polarizing plates opposing each other via the liquid crystal layer, light transmission easy axes are arranged concentrically, while in the other polarizing elements, light transmission easy axes are arranged radially.

Alternatively, in the liquid crystal display device Including the axial symmetric polarizing plates of this invention disposed on an upper surface and a lower surface of a liquid crystal layer, the portion of each of the axial symmetric polarizing plates where light transmission easy axes are arranged with axial symmetry forms one polarizing element. In one of a pair of polarizing elements of the upper and lower axial symmetric polarizing plates opposing each other via the liquid crystal layer, light transmission easy axes are arranged in a clockwise spiral shape, while in the other polarizing element, light transmission easy axes are arranged in a counterclockwise spiral shape, and the light transmission easy axes of one of the pair of polarizing elements and the light transmission easy axes of the other polarizing element are perpendicular to each other.

Alternatively, the liquid crystal display device of this invention includes a pair of upper and lower polarizing plates each having a plurality of polarizing elements and a liquid crystal layer interposed therebetween, the polarizing elements of the upper polarizing plate and the polarizing elements of the lower polarizing plate opposing each other via the liquid crystal layer, wherein the polarizing elements of the upper polarizing plate and the polarizing elements of the lower polarizing plate opposing each other via the liquid crystal layer have light transmission easy axes in a curved shape of which axis directions are perpendicular to each other, and liquid crystal molecules existing in a portion of the liquid crystal layer interposed between the polarizing elements of the upper polarizing plate and the polarizing elements of the lower polarizing plate are oriented in a fixed direction on at least one of the polarizing plates.

In one embodiment of the invention, liquid crystal molecules of the liquid crystal layer are oriented in a TN mode, an STN mode, an ECB mode, or a π-cell mode.

In another embodiment of the invention, the liquid crystal layer is divided into a plurality of liquid crystal regions, and each liquid crystal region is surrounded by partitions.

In still another embodiment of the invention, the partitions are composed of a polymer material.

In still another embodiment of the invention, the liquid crystal region substantially corresponds to each pixel constituting a display screen.

Alternatively, the liquid crystal display device of this invention includes a pair of upper and lower polarizing plates each having a plurality of polarizing elements and a liquid crystal layer interposed therebetween, the polarizing elements of the upper polarizing plate and the polarizing elements of the lower polarizing plate opposing each other via the liquid crystal layer, wherein the polarizing elements of the upper polarizing plate and the polarizing elements of the lower polarizing plate opposing each other via the liquid crystal layer have light transmission easy axes or light absorption axes in a curved shape of which axis directions are perpendicular to each other, liquid crystal molecules existing in a portion interposed between the polarizing elements of the upper polarizing plate and the polarizing elements of the lower polarizing plate are oriented at random, and the liquid crystal layer has no partitions for dividing it into a plurality of liquid crystal regions.

In one embodiment, the image display using liquid crystal is conducted by a non-rubbing TN mode or a mode utilizing an alignment film having a spherulite structure.

Alternatively, the liquid crystal display device of this invention includes a pair of upper and lower polarizing plates each having a plurality of polarizing elements and a liquid crystal layer interposed therebetween, the polarizing elements of the upper polarizing plate and the polarizing elements of the lower polarizing plate opposing each other via the liquid crystal layer, wherein the polarizing elements of the upper polarizing plate and the polarizing elements of the lower polarizing plate opposing each other via the liquid crystal layer have light transmission easy axes in a curved shape of which axis directions are perpendicular to each other, major axes of liquid crystal molecules existing in a portion interposed between the polarizing elements of the upper polarizing plate and the polarizing elements of the lower polarizing plate are arranged with axial symmetry so that polarization for incident light is equivalent omnidirectionally in one plane, the liquid crystal layer is divided into a plurality of liquid crystal regions and each liquid crystal region is surrounded by partitions, and the axial symmetric polarizing plates contain at least a polymerized liquid crystal material having optical anisotropy.

In one embodiment of the invention, the partitions are composed of a polymer material.

In another embodiment of the invention, in the portion of the liquid crystal layer interposed between the upper and lower polarizing elements, major axes of liquid crystal molecules form a spiral shape on the upper and lower polarizing plates.

In still another embodiment of the invention, in the portion of the liquid crystal layer interposed between the upper and lower polarizing elements, directions of the light transmission easy axes or absorption axes of the upper and lower polarizing elements are the same as orientation directions of the liquid crystal molecules of this portion on the upper and lower polarizing plates.

In still another embodiment of the invention, in the portion of the liquid crystal layer interposed between the upper and lower polarizing elements, directions of the light transmission easy axes or absorption axes of the upper and lower polarizing elements are the same as orientation directions of the liquid crystal molecules of this portion on the upper and lower polarizing plates.

Alternatively, the liquid crystal display device of this invention includes a pair of upper and lower axial symmetric polarizing plates each having portions where light absorption axes are arranged with axial symmetry so that light transmission for incident light is equivalent omnidirectionally in one plane and a liquid crystal layer interposed therebetween, wherein the upper and lower axial symmetric polarizing plates are formed so that the absorption axes thereof are perpendicular to each other, the direction of the light absorption axes of one of the axial symmetric polarizing plates and the direction of major axes of liquid crystal molecules of the liquid crystal layer are the same, and the axial symmetric polarizing plates contain at least a polymerized liquid crystal material having optical anisotropy.

In one embodiment of the invention, the polymer layer constituting each of the axial symmetric polarizing plates contains a dichroic dye.

In another embodiment of the invention, the light absorption axes of one of the upper and lower axial symmetric polarizing plates form a clockwise spiral shape, while the light absorption axes of the other axial symmetric polarizing plate form a counterclockwise spiral shape.

Thus, according to the present invention, the axial symmetric polarizing plate includes a plurality of portions where light transmission easy axes or light absorption axes are arranged with axial symmetry so that light transmission or light absorption for incident light is equivalent omnidirectionally in one plane, and such axial symmetric polarizing plate contains at least a polymerized liquid crystal material and a dichroic dye. Accordingly, the dichroic dye can be fixed in a polymer region by polymerization of the polymerizable liquid crystal material, and thus thermally stable polarizing elements where the light transmission easy axes or light absorption axes are arranged with axial symmetry can be formed.

Each of the portions where light transmission easy axes or light absorption axes are arranged with axial symmetry constitute one polarizing element, and the polarizing element corresponds to one pixel constituting an image display screen. Accordingly, light from the pixel can be effectively polarized.

Each of the portions where light transmission easy axes or light absorption axes are arranged with axial symmetry constitute one polarizing element, and the polarizing element corresponds to a plurality of pixels constituting an image display screen. Accordingly, the number of polarizing elements can be reduced compared with the number of pixels.

Each of the portions where light transmission easy axes or light absorption axes are arranged with axial symmetry constitute one polarizing element, and a plurality of polarizing elements correspond to one pixel constituting an image display screen. Accordingly, the polarizing element can be made small compared with the pixel, and thus the arrangement of polarization axes in each polarizing element can be better controlled.

According to a method of the present invention, a plurality of narrow grooves are formed on at least a pair of substrates facing each other with axial symmetry, e.g., spirally, concentrically, or radially, a mixture containing at least a polymerizable liquid crystal material and a dichroic dye is injected in a space between the pair of substrates so as to allow the polymerizable liquid crystal material to be oriented along the narrow grooves, and the polymerizable liquid crystal material is cured under this state. Accordingly, a stable axial symmetric polarizing plate with high contrast can be easily fabricated.

According to another method of the present invention, partitions are formed on an inner surface of at least one of a pair of substrates each having an electrode on the inner surface for dividing the inner surface into a plurality of regions, and after injecting a mixture containing at least a polymerizable liquid crystal material and a dichroic dye in a space between the pair of substrates, the polymerizable liquid crystal material is oriented so that the major axes of the liquid crystal molecules are arranged with axial symmetry, e.g., spirally, concentrically, or radially when a voltage is applied between the pair of substrates, and the polymerizable liquid crystal material is cured while keeping the orientation of the polymerizable liquid crystal material. Accordingly, a stable axial symmetric polarizing plate with high contrast can be easily fabricated.

According to a liquid crystal display device of the present invention, one of the axial symmetric polarizing plates contains a p-type dichroic dye, while the other axial symmetric polarizing plate contains an n-type dichroic dye. Accordingly, a liquid crystal display device where the light transmission easy axes or light absorption axes of the upper and lower axial symmetric polarizing plates are perpendicular to each other while the orientation of liquid crystal molecules of the polymerized liquid crystal material of the upper and lower axial symmetric polarizing planes are the same can be easily fabricated.

According to another liquid crystal display device of the present invention, in one of a pair of polarizing elements of the upper and lower axial symmetric polarizing plates opposing each other via the liquid crystal layer, light transmission easy axes or light absorption axes are arranged concentrically, while in the other polarizing elements, light transmission easy axes or light absorption axes are arranged radially. Accordingly, a liquid crystal display device where the light transmission easy axes or light absorption axes of the upper and lower axial symmetric polarizing plates are perpendicular to each other.

According to still another liquid crystal display device of the present invention, in one of a pair of polarizing elements of the upper and lower axial symmetric polarizing plates opposing each other via the liquid crystal layer, light transmission easy axes or light absorption axes are arranged in a clockwise spiral shape, while in the other polarizing element, light transmission easy axes or light absorption axes are arranged in a counterclockwise spiral shape. Accordingly, a liquid crystal display device where the light transmission easy axes or light absorption axes of the upper and lower axial symmetric polarizing plates are perpendicular to each other can be obtained.

According to still another liquid crystal display device of the present invention, the liquid crystal cell where liquid crystal molecules in the liquid crystal layer are linearly oriented on one of the pair of substrates sandwiching the liquid crystal layer is combined with the pair of upper and lower polarizing plates having light transmission easy axes or light absorption axes arranged in a curved shape and perpendicular to each other. Accordingly, the viewing angle characteristics can be improved without generating disclination lines.

Liquid crystal molecules of the liquid crystal layer are oriented in a twisted nematic (TN) mode, a super-twisted nematic (STN) mode, an electrically controlled birefringence (ECB) mode, or a π-cell mode. Accordingly, the viewing angle characteristics can be improved for the liquid crystal of these orientation modes.

The liquid crystal layer is divided into a plurality of liquid crystal regions, and each liquid crystal region is surrounded by partitions. Accordingly, the liquid crystal layer is reinforced by the partitions, increasing the durability of the display portion of the resultant liquid crystal display device against an external force.

The partitions are composed of a polymer material. Accordingly, the partitions can be easily formed by phase separation of the polymer.

The liquid crystal region substantially corresponds to each pixel constituting a display screen. Accordingly, the partitions will not disturb the liquid crystal display.

According to still another liquid crystal display device of the present invention, the liquid crystal cell of which liquid crystal molecules are oriented at random is combined with the pair of upper and lower polarizing plates having light transmission easy axes or light absorption axes arranged in a curved shape and perpendicular to each other. Also, the liquid crystal layer has no partitions for dividing it into a plurality of liquid crystal regions. Accordingly, the fabrication process is simplified.

The image display using liquid crystal is conducted by a non-rubbing TN mode or a mode utilizing an alignment film having a spherulite structure. Accordingly, alignment of liquid crystal molecules is not necessary.

According to still another liquid crystal display device of the present invention, the liquid crystal cell having liquid crystal molecules oriented with axial symmetry so that light transmission or light absorption is equivalent omnidirectionally in one plane is combined with the pair of upper and lower polarizing plates having light transmission easy axes or light absorption axes arranged in a curved shape and perpendicular to each other. Accordingly, the display where the viewing angle characteristics are uniform omnidirectionally can be obtained.

Also, the liquid crystal layer is divided into a plurality of liquid crystal regions and each liquid crystal region is surrounded by partitions. Accordingly, the liquid crystal layer is reinforced by the partitions, increasing the durability of the display portion of the resultant liquid crystal display device against an external force.

The partitions are composed of a polymer material. Accordingly, the partitions can be easily formed by phase separation of the polymer.

In the portion of the liquid crystal layer interposed between the upper and lower polarizing elements, the major axes of liquid crystal molecules form a spiral shape on the upper and lower polarizing plates. Accordingly, the alignment treatment for the upper and lower substrates can be conducted in the same process.

In the portion of the liquid crystal layer interposed between the upper and lower polarizing elements, directions of the light transmission easy axes or absorption axes of the upper and lower polarizing elements are the same as orientation directions of the liquid crystal molecules of this portion on the upper and lower polarizing plates. Accordingly, the display characteristics such as the brightness of the front of the display screen and the driving voltage can be improved.

According to still another liquid crystal display device of the present invention, the device includes a pair of upper and lower axial symmetric polarizing plates each having portions where light absorption axes are arranged with axial symmetry so that light transmission or light absorption for incident light is equivalent omnidirectionally in one plane and a liquid crystal layer interposed therebetween, and the directions of the major axes of liquid crystal molecules of the liquid crystal layer on the substrates are the Same as the directions of the polarization axes of the axial symmetric polarizing plates on the corresponding substrates. Accordingly, the contrast can be further improved. Moreover, since the axial symmetric polarizing plates contain a polymerized liquid crystal material having optical anisotropy, the arrangement of the polarization axes can be easily conducted by alignment and polymerization of the polymerizable liquid crystal material.

The polymer layer constituting each of the axial symmetric polarizing plates contains a dichroic dye. Accordingly, a liquid crystal cell where the dichroic dye is fixed in the polymer can be easily formed by polymerization of the polymerizable liquid crystal material.

The light absorption axes of one of the upper and lower axial symmetric polarizing plates form a clockwise spiral shape, while the light absorption axes of the 20 other axial symmetric polarizing plate form a counterclockwise spiral shape. Accordingly, the arrangement of the polarization axes of the axial symmetric polarizing plates can be easily conducted.

Thus, the invention described herein makes possible at least one of the advantages of (1) providing an axial symmetric polarizing plate which has high contrast and can be fabricated thermally stably and easily, (2) providing a method for fabricating such an axial symmetric polarizing plate, (3) providing a liquid crystal display device capable of improving the viewing angle characteristics without generating disclination lines, and (4) providing a liquid crystal display device capable of realizing the omnidirectionally uniform display characteristics.

These and other advantages of the present invention will become apparent to those skilled in the art upon reading and understanding the following detailed description with reference to the accompanying figures.

BRIEF DESCRIPTION OF THE DRAWINGS

FIG. 2A is a sectional view of a pair of substrates for polarizing plate fabrication used in the method: and FIG. 2B is a plan view of the pair of substrates.

FIG. 3A is a sectional view showing the state where a mixture of a polymerizable liquid crystal material and a dichroic dye is injected in a space between a pair of substrates; and FIG. 3B is a sectional view showing the state where one of the substrates is removed after a polymer layer constituting polarizing elements is formed.

FIG. 6A is a sectional view showing a pair of substrates for polarizing plate fabrication used for the fabrication of the axial symmetric polarizing plate; FIG. 6B is a plan view of the pair of substrates; and FIG. 6C is a sectional view showing the state where a mixture of a polymerizable liquid crystal material and a dichroic dye is injected in a space between the pair of substrates.

FIGS. 7A to 7C illustrate spiral-shaped, concentric, and radial arrangements, respectively; and FIG. 7D is a sectional view of the substrate having concentric narrow grooves.

FIGS. 8A and 88 are a sectional view and a plan view, respectively, of a substrate for polarizing plate fabrication used for this fabrication method; FIG. 8C is a sectional view showing the state where a mixed solution is applied to the substrate; and FIG. 8D is a plan view showing polarizing elements formed on the substrate.

FIG. 10A shows the state where incident light having one polarizing plane is incident on a liquid crystal molecule: FIG. 10B shows the state where incident light having two polarizing planes is incident on a liquid crystal molecule; and FIG. 10C shows the state where the birefringence is apparently averaged for the incident light having two polarizing planes.

FIG. 12A is a sectional view showing a TN device with axial symmetric polarizing plates; and FIG. 12B is a perspective view conceptually showing the TN device.

FIG. 15A illustrates the viewing angle characteristics obtained when a polarizing plate (uniaxial linearly polarized light) is combined with a randomly oriented or with axial symmetry oriented liquid crystal cell; FIG. 15B illustrates the viewing angle characteristics obtained when an axial symmetric polarizing plate is combined with a randomly oriented or with axial symmetry oriented liquid crystal cell.

FIG. 18A is a perspective view schematically showing the ASM device; and FIG. 18B is a sectional view of the ASM device.

FIG. 19A is a perspective view schematically showing the ASM device, and FIG. 19B is a sectional view of the ASM device.

FIG. 20A is a sectional view of the cell structure; and FIG. 20B is a plan view of the cell structure.

FIG. 21A is a perspective view schematically showing the ASM device; and FIG. 21B is a sectional view of the ASM device.

FIGS. 22A to 22C illustrate a method for fabricating the ASM device with axial symmetric polarizing plates of Example 10: FIG. 22A is a sectional view showing the state where a pair of substrates are laminated together; FIG. 22B is a sectional view showing the state where a liquid crystal material is injected in a space between the substrates; FIG. 22C is a plan view showing the state where partitions are formed on one of the substrates using a resist.

FIG. 23 shows the viewing angle characteristics of the ASM device with axial symmetric polarizing plates of Example 10.

FIGS. 24A to C show the shift in the orientation of liquid crystal molecules of a liquid crystal cell where the liquid crystal molecules are oriented in two directions; FIGS. 24D to 24F show the shift in the orientation of liquid crystal molecules of a liquid crystal cell of the normal TN mode.

DESCRIPTION OF THE PREFERRED EMBODIMENTS

Figure 1:
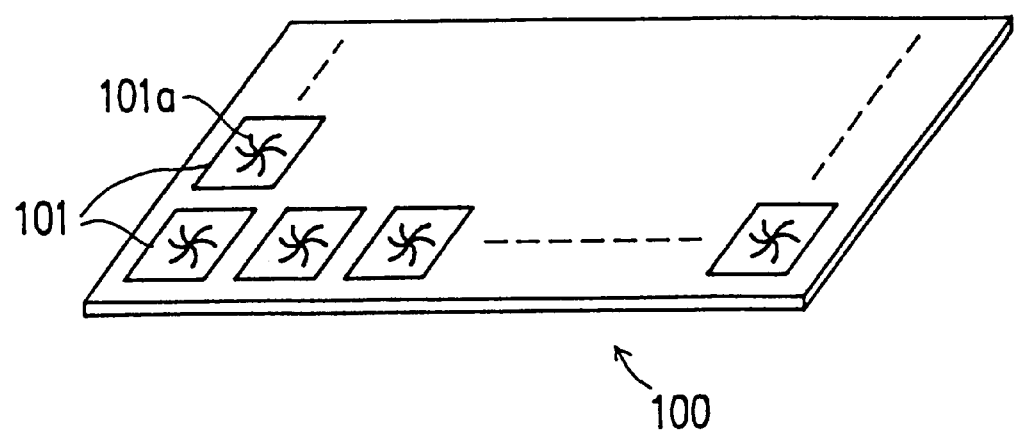
FIG. 1 is a perspective view illustrating an axial symmetric polarizing plate of Example 1 according to the present invention.

First, the basic principle of the present invention will be described.

The polarization axes (i.e., light transmission easy axes) of the axial symmetric polarizing plate according to the present invention are arranged with axial symmetry. The axial symmetrical arrangement includes radial, concentric (tangential), and spiral arrangements. The axial symmetric polarizing plate typically contains dichroic dye molecules oriented with axial symmetry, and local polarization axes of the axial symmetric polarizing plate are perpendicular to the absorption axes of the dichroic dye molecule. Therefore, for example, local polarization axes in a fine region of the axial symmetric polarizing plate containing dichroic dye molecules oriented radially are arranged concentrically (tangentially).

Since the local polarization axes of the axial symmetric polarizing plate are arranged substantially uniaxially, each fine region of the axial symmetric polarizing plate works as the conventional linear polarizing plate. The transmittance of the axial symmetric polarizing plate is about 50%, and light which has passed through the fine region of the axial symmetric polarizing plate becomes linearly polarized light.

1) Stability of axial symmetric polarizing plate:

According to the present invention, the axial symmetric polarizing plate includes a polymerizable liquid crystal material as a component. This makes it possible to fix a dichroic dye in a polymer structure (matrix) formed by polymerization of the polymerizable liquid crystal material. With this structure, an axial symmetric polarizing plate having extremely stable polarization axes can be obtained.

2) Combination of axial symmetric polarizing plate and linearly oriented liquid crystal cell:

Conventionally, the liquid crystal devices of the TN mode, STN mode, and ECB mode, for example, where liquid crystal molecules are oriented linearly on a substrate have poor viewing angle characteristics. The viewing angle characteristics of such liquid crystal display devices can be improved without generating disclination lines by combining the devices with the axial symmetric polarizing plate.

In the STN mode, in particular, color compensation can be conducted by the axial symmetric polarizing plate itself to some extent. Thus, inexpensive display devices can be provided.

3) Combination of axial symmetric polarizing plate and liquid crystal device where orientation of liquid crystal molecules is uniform omnidirectionally (axial symmetric):

By combining a liquid crystal display device where liquid crystal molecules are oriented axial-symmetrically on a substrate with the axial symmetric polarizing plate, the resultant liquid crystal display device has no dependency of the viewing angle characteristics upon the viewing direction. Hereinbelow, examples of such a liquid crystal display device combined with the axial symmetric polarizing plate are shown.

(a) A liquid crystal display device of which viewing angle characteristics have been improved by forming polymer projections in a cell by phase separation of a liquid crystal material and a photocurable resin from the mixture thereof to disturb the orientation of liquid crystal molecules.

(b) A liquid crystal display device where, in addition to the above procedure, the intensity of illuminated light is controlled using a photomask and the like at photopolymerization, so that the liquid crystal molecules have an omnidirectional (spiral-shaped) orientation. In such a liquid crystal display device, the oriented liquid crystal molecules are controlled by voltage application, allowing the liquid crystal molecules oriented spirally to operate in an umbrella-like manner. This significantly improves the viewing angle characteristics.

(c) A liquid crystal display device including alignment films made of crystalline polymer films having a spherulite or spherulite-like structure. A wide viewing angle display mode can be realized since the spherulite structure can control the axial symmetric orientation of the liquid crystal molecules through the liquid crystal display.

(d) A liquid crystal display device having viewing angle characteristics which have been improved by using alignment films not subjected to any alignment treatment such as rubbing, to allow liquid crystal molecules to be oriented at random.

In such combinations of the liquid crystal display devices and the axial symmetric polarizing plates, particularly when the orientation direction of liquid crystal molecules on the substrate and the axis direction of the polarizing plate are the same, the display characteristics such as the brightness of the front face of the display screen and the driving voltage are improved.

Now, the present invention is described by way of examples with reference to the accompanied drawings.

EXAMPLE 1

FIG. 1 is a perspective view for illustrating an axial symmetric polarizing plate of Example 1 according to the present invention. Referring to FIG. 1, an axial symmetric polarizing plate 100 includes a plurality of polarizing elements 101. In each of the polarizing elements 101, light transmission easy axes or light absorption axes 101a (hereinafter, such axes are also called the polarization axes) are axial symmetric where light transmission or absorption for light incident on the polarizing element is equivalent omnidirectionally in one plane. In this example, the polarization axes 101a are in a clockwise spiral shape. The axial symmetric polarizing plate 100 includes a polymerized liquid crystal material and a dichroic dye as component materials.

According to the present invention, a polymerizable liquid crystal material is used to obtain the liquid crystalline polymer for improving the thermal stability. The polymerizable liquid crystal material is a compound containing in one molecule both a mesogen group which is expected to express liquid crystallinity and a polymerization group which is polymerizable by light or heat. Such a compound has a liquid crystalline phase such as a nematic phase and exhibits substantially the same behavior as liquid crystal on the orientation, the response to voltage application, and the like before polymerization. After polymerization, it can be used as a stable polymer compound.

According to the present invention, molecules of the mixture of the polymerizable liquid crystal material and the dichroic dye are oriented with axial symmetry. Thereafter, the mixture is polymerized, while keeping the axial symmetric orientation from being disturbed. The dichroic dye molecules are fixed in the molecules of the polymerized liquid crystal material obtained by the polymerization so that the axial symmetry of the orientation can be retained. According to this method, the dichroic dye molecules can be firmly fixed since they are fixed by the polymer material which is a solvent (host) for the dichroic dye molecules.

As another method for fixing the dichroic dye molecules, a dichroic dye is solved in a polymer solution and the dichroic dye molecules are fixed in a spherulite structure or a polymer-polymer phase separation structure.

The polymerizable liquid crystal material and the dichroic dye will be described in more detail. The polymerizable liquid crystal material as used herein refers to a compound of which molecule is composed of a polymerizable group A, a linking group a, and a mesogen group LC expected to express liquid crystallinity in the relationship shown below:

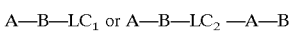

In the above compounds, A represents a polymerizable functional group, for example, a functional group having an unsaturated bond, such as $CH_2$=CH—, $CH_2$=CH—COO—, $CH_2$=CH($CH_3$)—COO—,

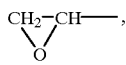

and —N=C=O, and a functional group having a heterocyclic structure with a distortion, such as an epoxy group.

As the linking group B, a group such as an alkyl group (—$(CH_2)n$—), an ester group (—COO—), an ether group (—O—), a polyethylene glycol chain (—$CH_2CH_2O$—), and a combination thereof can be used.

As the mesogen group which plays an important role in expressing liquid crystallinity, a structure can be used where a linking group bonded to a portion having a rigid molecular skeleton, such as a benzene ring, a cyclohexane ring, a paradiphenyl ring, a phenylcyclohexane ring, a terphenyl ring, and a diphenylcyclohexane ring, is partially substituted by a functional group which expresses dielectric constant anisotropy and the like, such as —CN, —$OCH_3$, —F, —Cl, $OCF_3$, and —$OCCl_3$.

The molecular structure of the polymerizable liquid crystal material used in the present invention is not restricted. Compounds generally used as the liquid crystal material can be used as the polymerizable liquid crystal material by introducing a polymerizable functional group in the compounds.

The liquid crystalline polymer as used in the present invention refers to a compound obtained by polymerizing the polymerizable liquid crystal material which is obtained by introducing a polymerizable functional to a liquid crystal molecule. The polymer itself does not have to exhibit liquid crystallinity at a certain temperature range.

Examples of the dichroic dye used in the present invention include merocyanine, anthraquinone, styryl, azobenzene dyes, and the like.

In particular, the dichroic dye may include both a chromophore and a polymerizable functional group. Having a polymerizable functional group in each molecule of the dichroic dye makes it possible to improve the stability of the resultant polarizing elements incorporated in a liquid crystalline polymer layer constituting the axial symmetric polarizing plate after polymerization.

The method for fabricating the axial symmetric polarizing plate shown in FIG. 1 will be described with reference to FIGS. 2A, 2B, 3A and 3B.

Figure 2A:
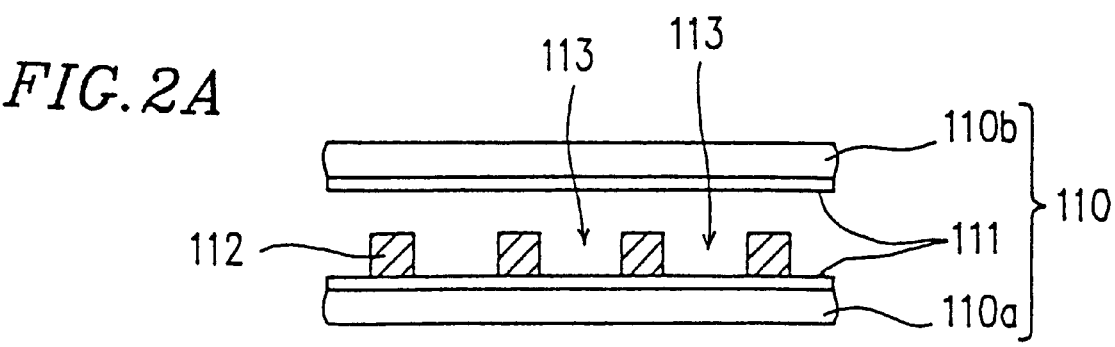
FIGS. 2A and 2B illustrate a method for fabricating the axial symmetric polarizing plate of Example 1.
Figure 2B:
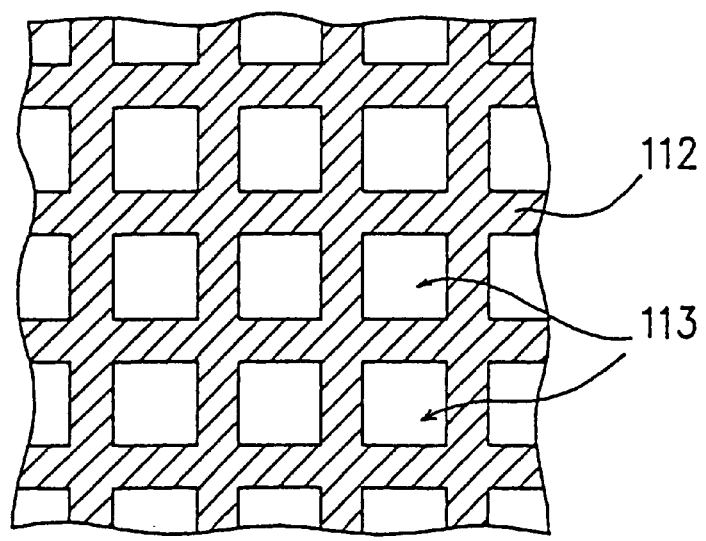
Figure 3A:
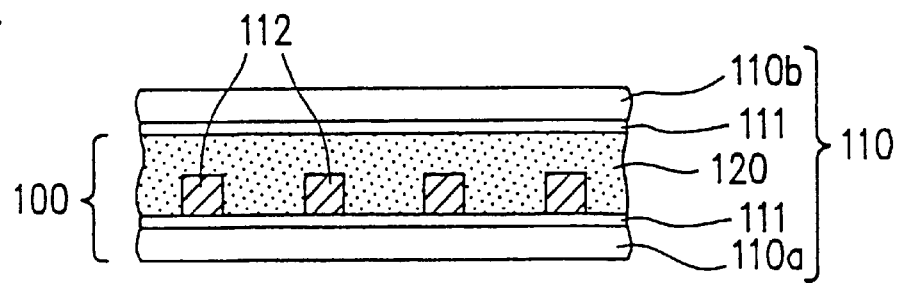
FIGS. 3A and 3B illustrate another method for fabricating the axial symmetric polarizing plate of Example 1.
Figure 3B:
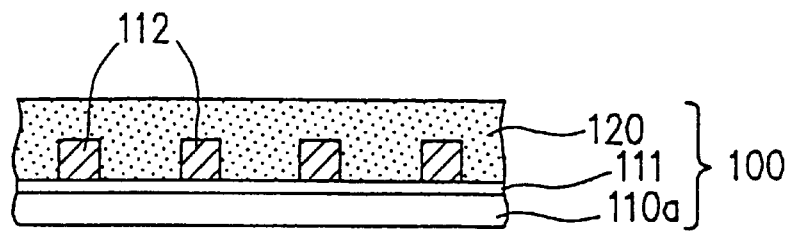

FIGS. 2A and 2B are a sectional view and a plan view, respectively, of a pair of substrates used for the fabrication of the axial symmetric polarizing plate of this example. FIGS. 3A and 3B are sectional views showing the state where a mixture of the polymerizable liquid crystal material and the dichroic dye is injected in a space between the pair of substrates and the state where one of the substrates has been removed after the formation of the polymer layer constituting the polarizing plate, respectively.

First, a pair of substrates 110a and 110b are disposed to face each other to form a cell 110 for polarizing plate fabrication. Electrode films 111 are formed on the surfaces of the substrates 110a and 110b facing each other. Partitions 112 are formed on the electrode film 111 on the substrate 110a for dividing the surface region of the electrode film 111 into a plurality of pixel regions 113 (each corresponding to a polarizing element 101). The partitions 112 may be made of a polymer material or an inorganic material, and should be formed on at least one of the substrates At least one of the substrates 110a and 110b and the electrode film formed thereon should be made of materials which allow ultraviolet light to pass therethrough so as to conduct the photo-polymerization of the polymerizable liquid crystal material.

Thereafter, the mixture of the polymerizable liquid crystal material and the dichroic dye described above is injected in the space between the substrates. The resultant structure is then processed to have liquid crystal domains each corresponding to one pixel region, and liquid crystal molecules in each liquid crystal domain corresponding to one pixel region are oriented with axial symmetry by applying a voltage. Then, the liquid crystal domains are grown under this state, thus to complete the cell 110.

In order to fix the above orientation, the substrate which transmits ultraviolet light is irradiated with ultraviolet light to cure the polymerizable liquid crystal material. In this ultraviolet irradiation, the polymerizable liquid crystal material is preferably gradually photo-polymerized so that the orientation of the liquid crystal molecules will not be changed due to the polymerization. The intensity of ultraviolet light is preferably 5 mW/cm$^2$ or less.

The axial symmetric orientation of the liquid crystal molecules is thus fixed by the curing of the polymerizable liquid crystal material. At this curing, the dichroic dye molecules in the polymerizable liquid crystal material are also fixed in the matrix of the polymerizable liquid crystal material. As a result, the axial symmetric polarizing plate 100 having a plurality of polarizing elements 101 each of which has light absorption axes or light transmission easy axes are arranged with axial symmetry can be fabricated.

Then, the substrate 110b is removed from the resultant structure (see FIG. 3B) to complete the axial symmetric polarizing plate 100. If both the substrates are transparent to light, the substrate 110b does not need to be removed.

In this example, a chiral agent is added to the polymerizable liquid crystal material so that the polarization axes are arranged spirally. The direction of the spiral is determined by the direction of the optical rotatory power of the chiral agent (i.e., right-handed or left-handed).

In this example, the arrangement of the light absorption axes or light transmission easy axes is spiral. When the chiral agent is not added to the polymerizable liquid crystal material, the molecules of the polymerizable liquid crystal material are oriented so that the major axes of the molecules form a concentric shape. In this case, it is preferable to use as the dichroic dye a p-type dye of which light absorption axes are parallel to the major axes of the liquid crystal molecule when the concentric arrangement of the absorption axes are desired, and an n-type dye of which light absorption axes are vertical to the major axes of the liquid crystal molecules when the radial arrangement of the absorption axes are desired.

EXAMPLE 1-1

In this example, an axial symmetric polarizing plate of which polarization axes are arranged concentrically will be described. Glass substrates with a thickness of 1.1 mm were used as the pair of substrates 110a and 110b for fabricating the axial symmetric polarizing plate of this example. ITO (a mixture of indium oxide and tin oxide) films with a thickness of 1000 Å were used as the transparent electrodes formed on the substrates 110a and 110b. The partitions 112 shown in FIGS. 2A and 2B were formed on the glass substrate 110a using a photoresist made of OMR-83 (manufactured by Tokyo Ohke Kogyo Co., Ltd.). A mold release agent was applied to the substrate 110b. The thus-fabricated two substrates were laminated with 5 μm—long spacers placed therebetween to define the cell thickness, thereby to form the cell for polarizing plate fabrication. A mixed compound D (0.10 g) with a composition shown in Table 1 below, a dichroic dye S-301 (manufactured by Mitsui Toatsu Senryou, Ltd.) (0.002 g), and an photo-initiator Irgacure 651 (0.002 g) were uniformly mixed, and the mixture was injected in the cell.

TABLE 1

| Compound D | weight % |
|---|---|
| 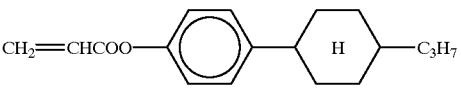 | 40 |
| 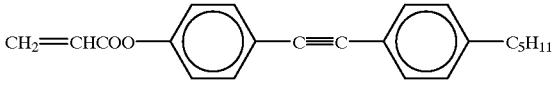 | 40 |
|  | 20 |

Thereafter, the cell was processed to have liquid crystal domains each corresponding to one pixel region, and liquid crystal molecules in each liquid crystal domain corresponding to one pixel region were oriented with axial symmetry by applying a voltage. Then, the liquid crystal domains were grown under this state to complete the cell 110.

Subsequently, the polymerizable liquid crystal material was polymerized using light with an intensity of 1.0 mW/cm$^2$ (365 nm) from an ultraviolet lamp for 20 minutes to cure monomers. The resultant structure was then annealed at 150° C. for 30 minutes to form the axially symmetric polarizing plate 100 in the cell. The substrate 110b with the mold release agent applied thereto was then removed. At the curing, the dichroic dye molecules in the polymerizable liquid crystal material were also fixed in the polymer matrix. As a result, the axial symmetric polarizing plate having light absorption axes or light transmission easy axes arranged with axial symmetry was fabricated.

Figure 4A:
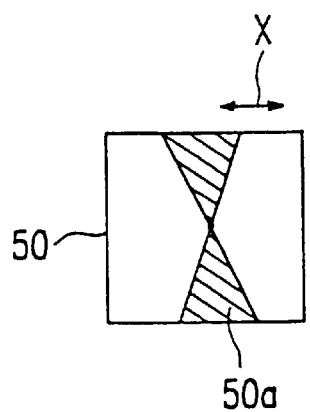
FIGS. 4A and 4B illustrate the results of the observation of the axial symmetric polarizing plate of Example 1 with a polarizing microscope using another polarizing plate.
Figure 4B:
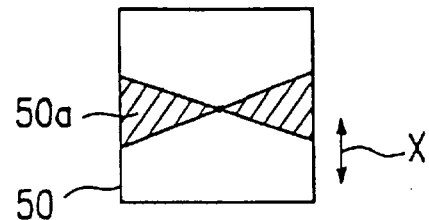

The thus-fabricated axial symmetric polarizing plate 100 was observed with a polarizing microscope which uses one uniaxial polarizing plate 50 in the polarizing direction X. As a result, as shown in FIGS. 4A and 4B, it was found that the polarization axes of the polarizing plate were arranged with axial symmetry and the light absorption axes were arranged concentrically. FIGS. 4A and 4B show the arrangements of the uniaxial polarizing plate 50 with respect to the axial symmetric polarizing plate 100. The polarizing direction X of the uniaxial polarizing plate 50 with respect to the axial symmetric polarizing plate 100 in the arrangement shown in FIG. 4A was shifted by 90° from that in the arrangement shown in FIG. 4B. The reference numeral 50a in FIGS. 4A and 4B denotes an extinction region which appears when transmitted light from the axial symmetric polarizing plate 100 is observed via the uniaxial polarizing plate 50.

Figure 5:
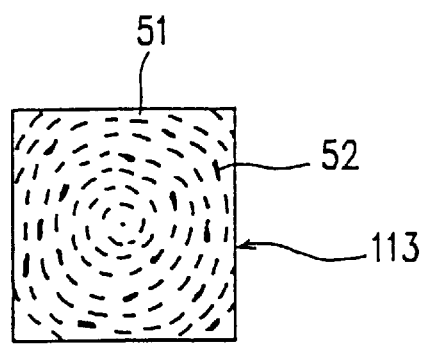
FIG. 5 conceptually illustrates the orientations of liquid crystal molecules and dichroic dye molecules in the axial symmetric, polarizing plate of Example 1.

FIG. 5 shows a conceptual molecule arrangement in each polarizing element (pixel region) 113 of the axial symmetric polarizing plate. The orientation of the polymerized liquid crystal molecules 51 is concentric. Dichroic dye molecules 52 are located between the liquid crystal molecules 51 along the orientation of the liquid crystal molecules 51.

EXAMPLE 1-2

In this example, the axial symmetric polarizing plate is fabricated in the same manner as that of Example 1-1, except that the dichroic dye in Example 1-1 is replaced with an n-type azulene derivative mixture. The polarizing plate obtained in Example 1-1 and that obtained in Example 1-2 were disposed to face each other and aligned to observe light transmission through these polarizing plates. As a result, a black state was observed, i.e., light was completely blocked by the polarizing plates. This indicates that the light absorption axes of the axial symmetric polarizing plate fabricated in Example 1-2 are arranged radially,

EXAMPLE 2

Figure 6A:
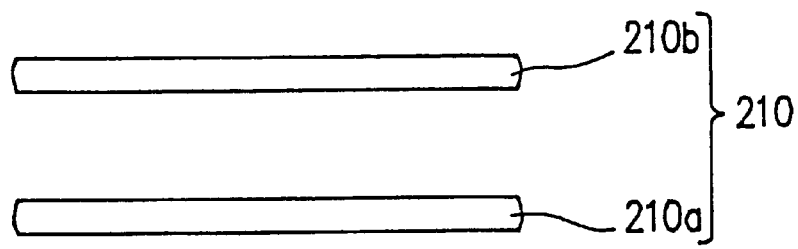
FIGS. 6A, 6B, and 6C illustrate an axial symmetric polarizing plate of Example 2 according to the present invention.
Figure 6B:
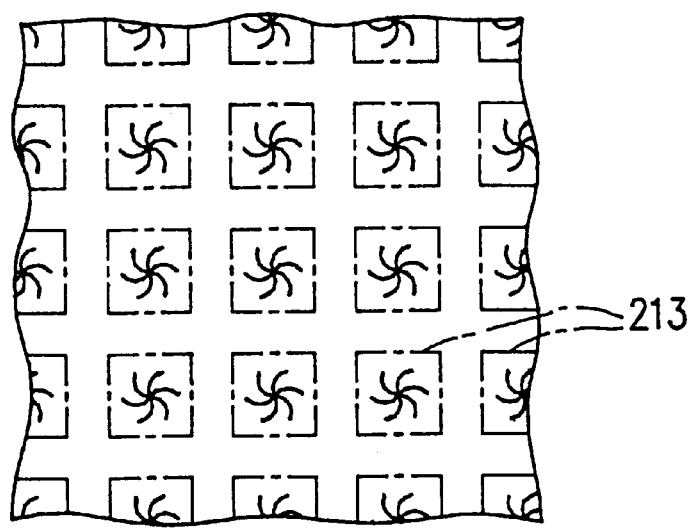
Figure 6C:
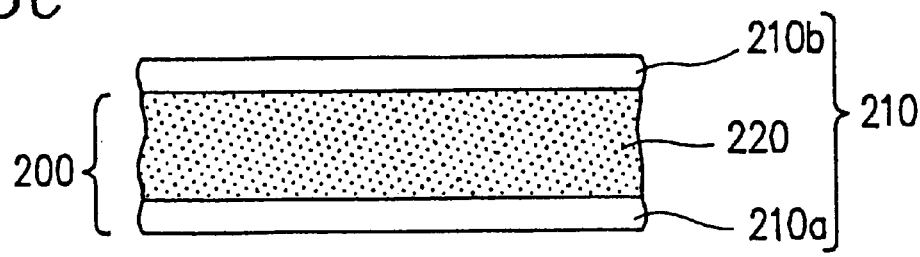

FIGS. 6A and 6B are a sectional view and a plan view of a pair of substrates used for the fabrication of an axial symmetric polarizing plate of Example 2 according to the present invention. FIG. 6C is a sectional view showing the state where a mixture of a polymerizable liquid crystal material and a dichroic dye has been injected in a space between the pair of substrates.

First, a pair of substrates 210a and 210b are disposed to face each other to form a cell 210 for polarizing plate fabrication. Narrow grooves are formed axial symmetrically, for example, concentrically, radially, or spirally, on regions 213 on the surfaces of the substrates 210a and 210b facing each other. The regions 213 correspond to a predetermined number of pixels. By forming a desired number of regions 213 for each pixel, a predetermined number of polarizing elements corresponding to pixels can be formed. In this example, the narrow grooves are formed spirally. Therefore, the directions of the spirals of the narrow grooves formed on the two substrates are reverse to each other. At least one of the substrates 210a and 210b should be composed of a material which allows ultraviolet light to pass therethrough. The regions where the polarizing elements are formed may be surrounded by partitions as in Example 1 shown in FIG. 1. In this example, however, no partition is used.

Thereafter, the mixture of the polymerizable liquid crystal material and the dichroic dye described above is injected in the space between the substrates. At this time, molecules of the polymerizable liquid crystal material are aligned along the narrow grooves formed on the substrates, and the major axes of the dichroic dye molecules are oriented in the orientation direction of the molecules of the polymerizable liquid crystal material. This makes it possible to fabricate the axial symmetric polarizing plate 200 having a plurality of polarizing elements having light absorption axes or light transmission easy axes arranged axial symmetrically.

Then, in order to fix the above orientation, the mixture in the cell 210 is irradiated with ultraviolet light as in Example 1.

By the curing of the polymerizable liquid crystal material, the axial symmetric orientation of the molecules of the polymerizable liquid crystal material are fixed. At this time, the dichroic dye molecules in the polymerizable liquid crystal material are also fixed in the polymer matrix. Thus, the axial symmetric polarizing plate 200 having a plurality of polarizing elements having light absorption axes or light transmission easy axes arranged axial symmetrically can be fabricated.

One of the substrates 210a and 210b may be removed before the completion of the axial symmetric polarizing plate 200, or the substrate may be retained to be used as a protection film.

Figure 7A:
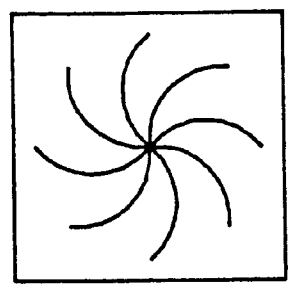
FIG. 7A to 7D illustrate the arrangements of narrow grooves formed on the pair of substrates in Example 2.
Figure 7B:
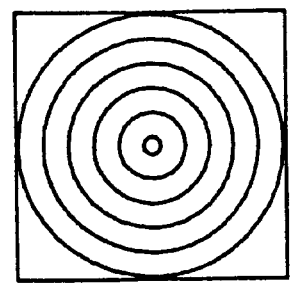
Figure 7C:
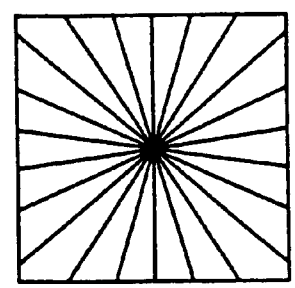
Figure 7D:
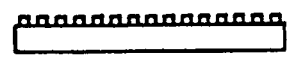

In this example, the narrow grooves are formed spirally as shown in FIG. 7A. Alternatively, they may be formed concentrically as shown in FIG. 7B or radially as shown in FIG. 7C. These shapes are appropriately selected so that the light absorption axes of the pair of axial symmetric polarizing plates disposed on the opposite surfaces of a liquid crystal cell are perpendicular to each other. FIG. 7D is a sectional view of the substrate on which the narrow grooves are formed. When the spiral shape is adopted, the substrates with the same spiral-shaped narrow grooves can be used for the fabrication of the two axial symmetric polarizing plates with light absorption axes perpendicular to each other to be disposed on the opposite surfaces of a liquid crystal cell. This is advantageous because the quantity of expensive members such as a mask required for forming the narrow grooves can be reduced. Further, when the upper and lower axial symmetric polarizing plates are intended to be disposed so that the polarization axes thereof form a certain angle other than 90°, such an angle can be obtained by the axial symmetric polarizing plates of which polarization axes ore arranged spirally. It cannot be obtained by the axial symmetric polarizing plates of which polarization axes are arranged concentrically or radially.

EXAMPLE 2-1

Three pairs of glass substrates were prepared for forming cells for polarizing plate fabrication. Spiral-shaped narrow grooves shown in FIG. 7A were formed on the first pair of substrates, concentric narrow grooves shown in FIG. 7B were formed on the second pair of substrates, and radial narrow grooves shown In FIG. 7C were formed on the third pair of substrates. Mold release agent was applied to one of each pair of substrates. These pairs of substrates were attached together with 5 µm (diameter) spacers therebetween to define the cell thickness, to complete three cells for polarizing plate fabrication.

Then, the mixture used in Example 1 was injected in each cell. After the injection, the mixture was heated and then gradually cooled, so that molecules of the polymerizable liquid crystal material are oriented along the narrow grooves formed on the glass substrates. Under this state, as in Example 1, the polymerizable liquid crystal material was cured with ultraviolet light to fix the orientation of the molecules. Thus, the axial symmetric polarizing plates of which polarization axes are arranged radially, concentrically, and spirally were fabricated.

In Examples 2-2 and 2-3 below, other methods for fixing the dichroic dye molecules into a predetermined orientation will be described.

EXAMPLE 2-2

Figure 8A:
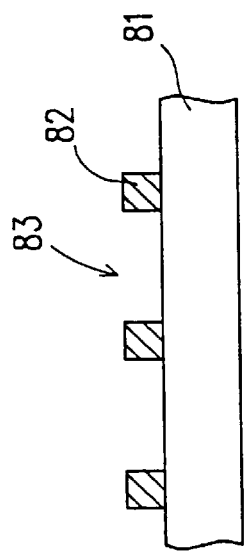
FIGS. 8A to 8D illustrate a method for fabricating the axial symmetric polarizing plate of Example 2.
Figure 8B:
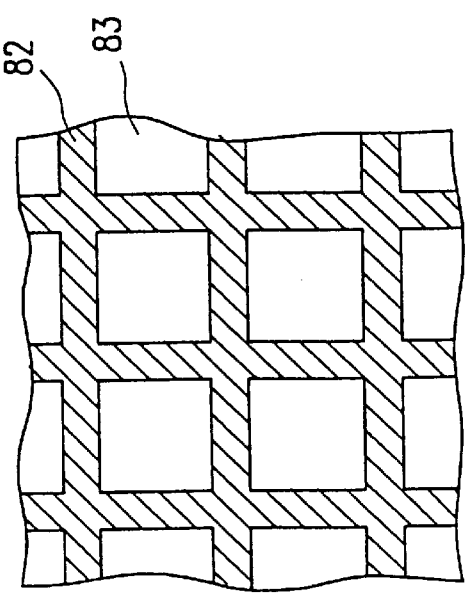

FIGS. 8A to 8D are views for illustrating the method of this example. FIGS. 8A and 8B are a sectional view and a plan view, respectively, of a substrate used in the method of this example.

Partitions 82 made of a polymer are formed on a surface of a substrate 81 for polarizing plate fabrication to divide the surface into a plurality of pixel regions 83. In other words, the surface of the substrate 81 has a plurality of patterned regions having different surface free energy.

Figure 8C:
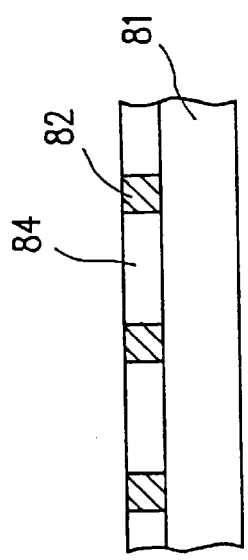
Figure 8D:
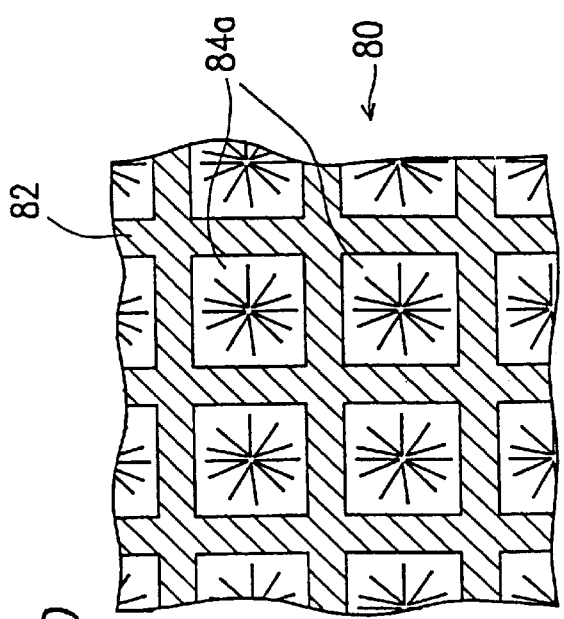

As shown in FIG. 8C, a mixed solution 84 obtained by dissolving polymers of different types, which are not miscible with each other, in a common solvent is applied to the surface of the substrate 81. The mixed solution 84 contains a dichroic dye. By gradually removing the solvent of the mixed solution 84, phase separation of the polymers of different types emerges as shown in FIG. 8D. At this time, the dichroic dye molecules are fixed in gaps between the polymer phases of different types, forming the radial orientation of the molecules. Thus, polarizing elements 84a of which polarization axes are arranged concentrically (in the case of p-type dye) are formed in the respective pixel regions on the substrate 81. In this way, an axial symmetric polarizing plate 80 having a plurality of polarizing elements 84a is fabricated.

Specifically, two types of alignment film materials which are not miscible with each other and a dichroic dye were mixed in a common solvent, and the resultant mixture were applied to a surface of the substrate 81 for polarizing plate fabrication shown in FIG. 8A. The solvent was gradually removed from the substrate, to form polymer thin films. Molecules of the polymer thin films were oriented radially in each pixel region as shown in FIG. 8D. The resultant axial symmetric polarizing plate was observed with a polarizing microscope as in Example 1, and found that the light absorption axes were arranged axial symmetrically in the polymer thin films formed in the respective pixel regions.

EXAMPLE 2-3

Figure 9:
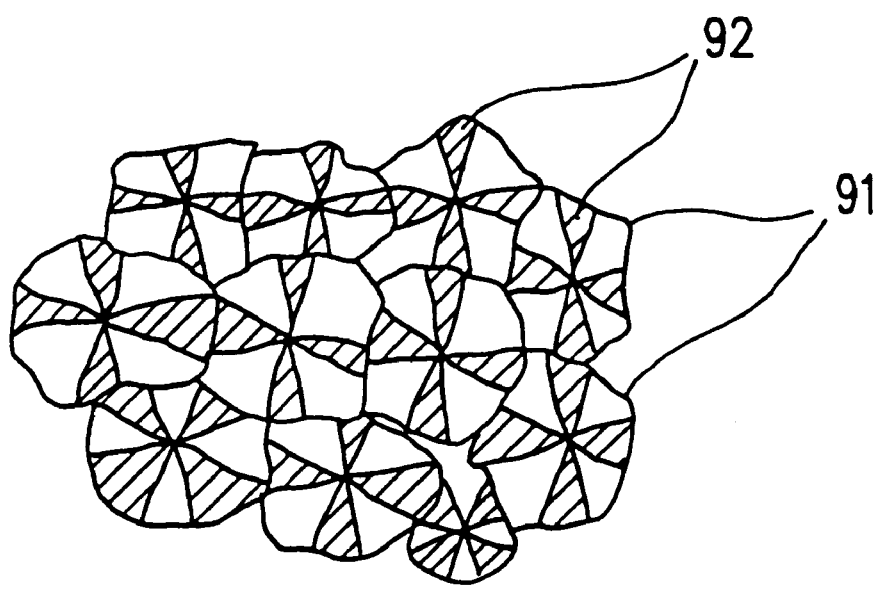
FIG. 9 illustrates another method for fabricating the axial symmetric polarizing plate of Example 2, showing a planar spherulite structure of a polymer film observed with a polarizing microscope.

FIG. 9 is a view for illustrating the method of this example, which shows a planar spherulite structure of polymer thin films observed with a polarizing microscope. The spherulite structure as used herein refers to a spherical polycrystalline structure where a number of crystals (microcrystals) have been grown radially from one point. In FIG. 9, the reference numerals 91 and 92 denote spherulite portions of the crystalline polymer and extinction portions observed in the spherulite portions, respectively.

In the method of this example, a mixture of a crystalline polymer solution and a dichroic dye added thereto is applied to a substrate (not shown), and a solvent is gradually removed to form the planar spherulite structure. At this time, the dichroic dye molecules are fixed between microcrystals of the polymer, resulting in forming polarizing elements of which light absorption axes are arranged radially in the respective spherulite portions. As the crystalline polymer, polyamide such as Nylon, polyester such as PET, and the like are used.

In Examples 3 to 11 below, various combinations of the axial symmetric polarizing plate and the liquid crystal mode will be described.

In Examples 3 to 5, the combination of a liquid crystal display device of a uniaxially oriented liquid crystal mode and the axial symmetric polarizing plate will be described.

The uniaxially oriented liquid crystal mode au used herein refers to a mode where liquid crystal molecules are oriented in one direction on substrates with alignment films subjected to rubbing or other alignment treatment. The twisted nematic (TN) mode, the supertwisted nematic (STN) mode, the electrically controlled birefringence (ECB) mode, the π cell mode, and the like belong to this mode, and they are determined depending on the orientation direction of liquid crystal molecules between the pair of substrates, the amount of a chiral agent added to the liquid crystal material, and the like. In these modes, since the liquid crystal molecules rise in one direction, the viewing angle characteristics of the resultant device are poor as described in the prior art.

Figure 10A:
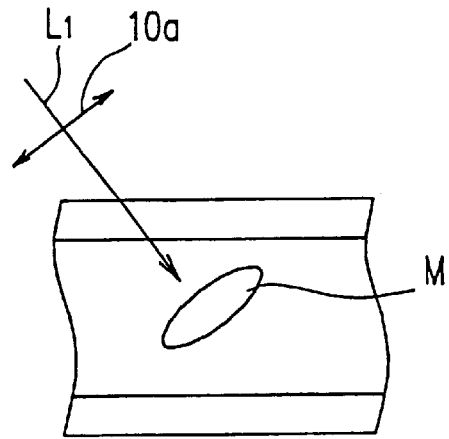
FIGS. 10A to 10C illustrate the relationship between the polarizing plane of incident light and the birefringence of liquid crystal molecules.
Figure 10B:
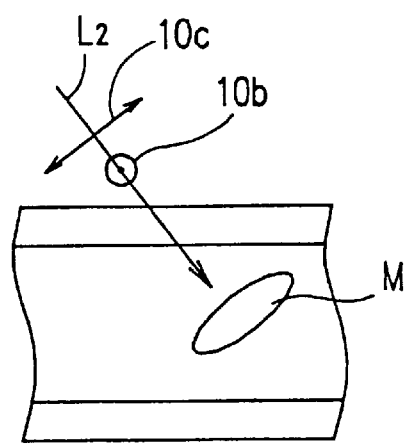
Figure 10C:
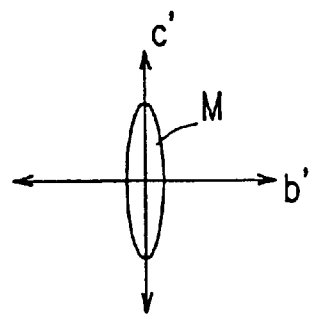

In the conventional liquid crystal display device, the polarization axes of the polarizing plate are arranged in one direction over the entire display plane. Accordingly, as shown in FIG. 10A, the birefringence (d.Δn) of the liquid crystal material for incident light $L_1$ having a predetermined one polarizing place 10a is determined unanimously. On the contrary, in the a liquid crystal display device according to the present invention, the polarization axes of the polarizing plate are arranged axial symmetrically for every pixel. Accordingly, as shown in FIG. 10B, incident light $L_2$ having a plurality of polarizing planes such as polarizing planes 10b and 10c passes through every pixel. As a result, as shown in FIG. 10C, an apparent birefringence, i.e., the difference between a refractive index c' in the major-axis direction of a molecule and a refractive index b' in the minor-axis direction thereof is averaged.

The above phenomenon of averaging the birefringence occurs in all viewing directions. Accordingly, though the averaged birefringence in one direction is slightly different from those in other directions, inversion of the display state can be prevented in a wide angle area. As a result, the viewing angle characteristics can be improved in each mode compared with that of the conventional device of the mode.

Further, since the orientation is uniform in the display device, disclination lines are not generated and thus the degradation in contrast is minimized.

EXAMPLE 3

In this example, a liquid crystal display device where the TN mode and the axial symmetric polarizing plate are combined will be described.

First, a conventional TN mode liquid crystal display device will be described as Comparative Example 1.

Figure 11:
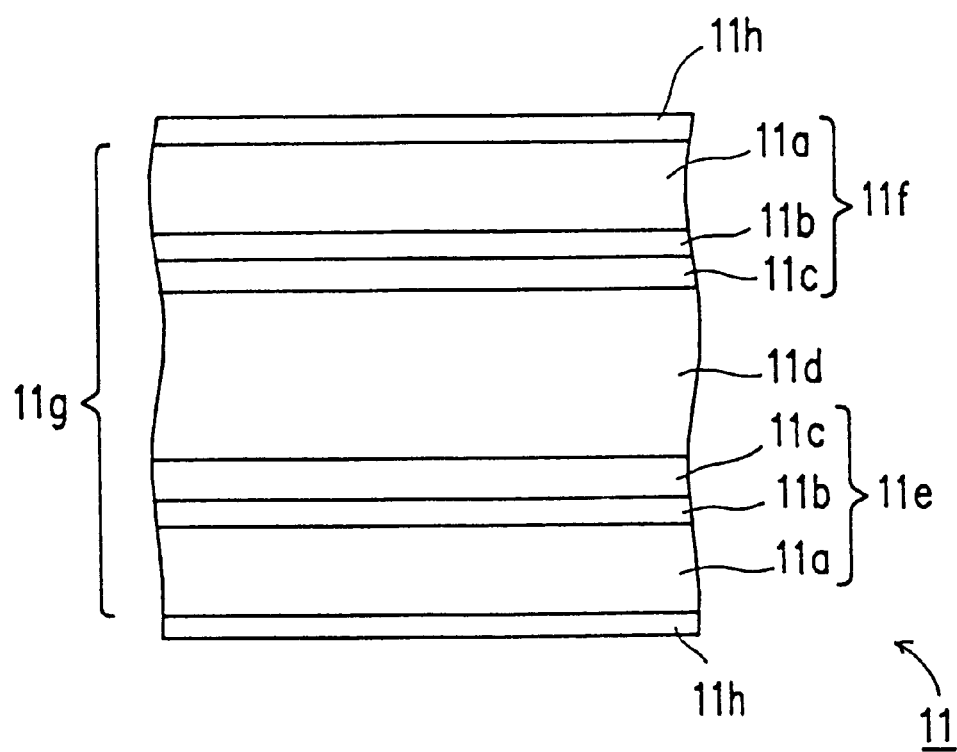
FIG. 11 is a sectional view showing a conventional TN mode liquid crystal display device (comparative Example 1).

FIG. 11 is a sectional view of the conventional TN mode liquid crystal display device (hereinafter, referred to as a "TN device"). Referring to FIG. 11, a TN device 11 includes a pair of substrates 11e and 11f facing each other and a liquid crystal layer 11d therebetween.

The TN device 11 was fabricated in the following manner.

A transparent electrode 11b made of ITO (a mixture of indium oxide and tin oxide) with a thickness of 1000 Å was formed on a glass substrate 11a with a thickness of 1.1 mm. Then, AL 4552 (manufactured by Japan Synthetic Rubber Co., Ltd.) was applied to the transparent electrode 11b to form an alignment film 11c. The alignment film 11c was then rubbed in one direction with Nylon cloth. Thus, substrates 11e and 11f were fabricated. The thus-fabricated substrates 11e and 11f were laminated together with 4.5 μm spacers therebetween to form a liquid crystal cell. Liquid crystal material ZLI-4792 (manufactured by Merck & Co., Inc,; containing chiral agent S811 to adjust the chiral pitch to 50 μm) were injected in the thus-fabricated liquid crystal cell. The resultant cell was heated and then gradually cooled. Polarizing plates 11h having light absorption axes arranged in one direction disposed on the opposite surfaces of the liquid crystal cell, aligning the direction with the orientation direction of liquid crystal molecules on the corresponding substrate. Thus, the conventional TN device 11 was fabricated. The viewing angle characteristics of the TN device 11 are as shown in Table 2 below.

Figure 12A:
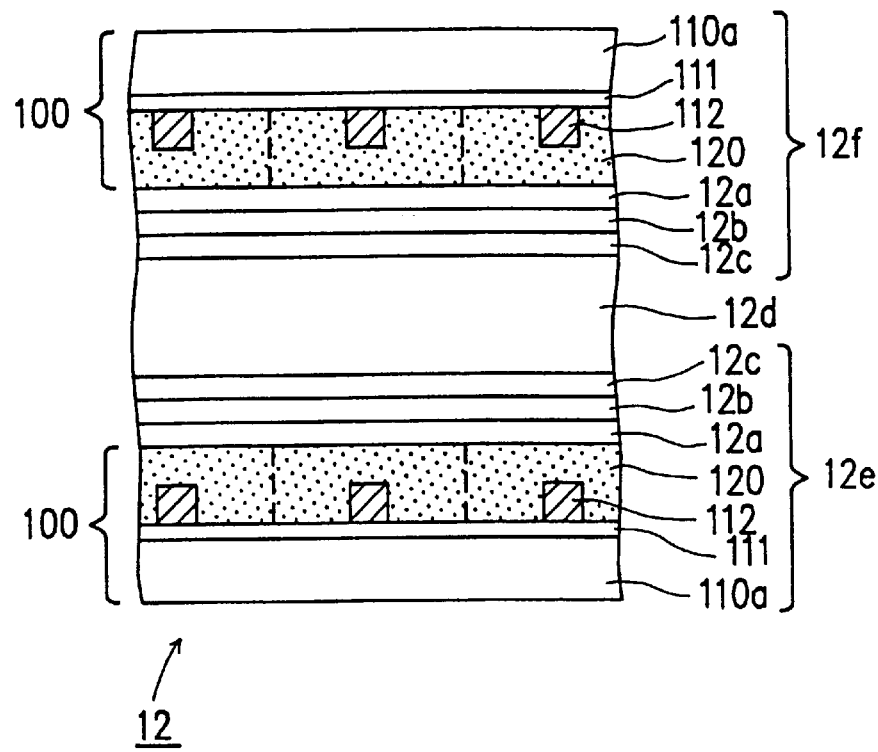
FIGS. 12A and 12B illustrate a liquid crystal display device of Example 3 according to the present invention.

FIG. 12A shows the liquid crystal display device of Example 3 according to the present invention, which is a TN device where the TN mode and the axial symmetric polarizing plate are combined (hereinafter, such a device is referred to as a "TN device with axial symmetric polarizing plates").

Referring to FIG. 12A, a TN device 12 with axial symmetric polarizing plates includes a pair of substrates 12e and 12f facing each other and a liquid crystal layer 12d therebetween. Each of the substrates 12e and 12f includes the axial symmetric polarizing plate 100 of Example 1.

The TN device 12 with axial symmetric polarizing plates was fabricated in the following manner.

A protection film 12a was formed on the polymer layer 120 of the axial symmetric polarizing plate 100 fabricated by the method described in Example 1. A transparent electrode 12b made of ITO was then formed on the protection film 12a to obtain an electrode-attached axial symmetric polarizing plate.

Figure 13:
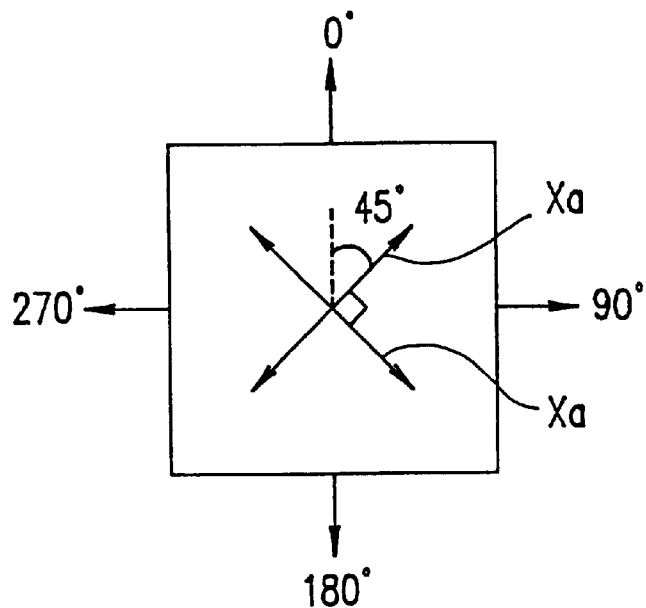
FIG. 13 illustrates the measuring directions of the viewing angle characteristics of a liquid crystal display device of Example 4 according to the present invention.

An alignment film 12c was formed on the electrode-attached axial symmetric polarizing plate and subjected to the same alignment treatment as that in Comparative Example 1. Thus, the substrates 12e and 12f were fabricated. The resultant substrates 12e and 112f were then laminated together with a predetermined space therebetween, aligning the polarization axes of the two axial symmetric polarizing plates 100. A liquid crystal material was injected in the space between the substrates 12e and 12f to form the liquid crystal layer 12d. The resultant cell was heated and then gradually cooled. Thus, the TN device 12 with axial symmetric polarizing plates was fabricated. The viewing angle characteristics of the TN device 12 of this example are as shown in Table 2 below. FIG. 13 shows the measurement direction with respect to an orientation direction Xa in the liquid crystal layer used in the measurement of the viewing angle characteristics shown in Table 2.

TABLE 2

| | Angle at which contrast inversion occurs | |
|---|---|---|
| | 90° direction | 270° direction |
| Comparative Example 1 | 30° | 30° |
| Example 3 | No contrast inversion | No contrast inversion |

The viewing angles at which contrast inversion occurs are substantially the same in Comparative Example 1 and Example 3 in the 0° and 180° directions with respect to the orientation direction in the liquid crystal layer of the TN device. On the contrary, as shown in Table 2, the contrast inversion is suppressed in the TN device of Example 3 in the 90° and 270° directions, unlike Comparative Example 1. This indicates that the viewing angle characteristics can be improved by using the axial symmetric polarizing plate.

In this example, the axial symmetric polarizing plate fabricated by the method described in Example 1 was used. The axial symmetric polarizing plate fabricated by the method described in Example 2 can also be used for the liquid crystal display device of this example.

Figure 12B:
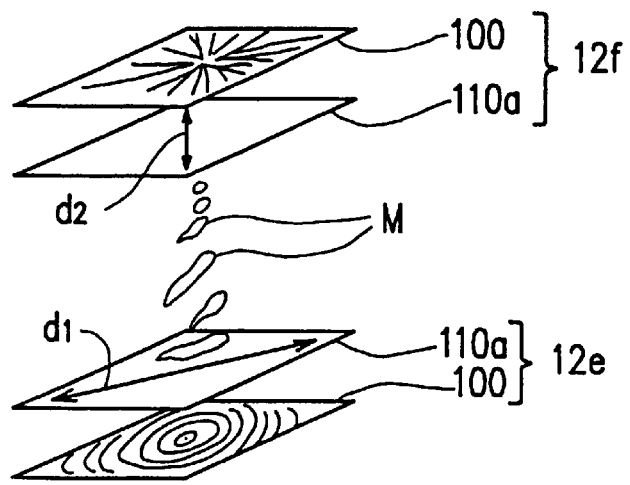

FIG. 12B schematically shows the structure of the TN device combining the TN mode and the axial symmetric polarizing plate fabricated by the method described in Example 1. The axial symmetric polarizing plate 100 of the upper substrate 12f has radially arranged polarization axes, while the axial symmetric polarizing plate 100 of the lower substrate 12e has concentrically arranged polarization axes. Liquid crystal molecules M are oriented in a direction $d_1$ on the lower substrate side and in a direction $d_2$ on the upper substrate side.

In this example, the axial symmetric polarizing plate was combined with the TN mode. The liquid crystal cell can also be fabricated by combining the axial symmetric polarizing plate with the STN mode. In such a case, the apparent phase difference can be averaged and thus color compensation can be achieved without using a phase plate (for whitening) used for conventional STN mode devices.

EXAMPLE 4

In this example, a liquid crystal display device where the STN mode and the axial symmetric polarizing plate are combined will be described.

First, a conventional STN mode liquid crystal display device (hereinafter, referred to as an "STN device") will be described as Comparative Example 2.

The conventional STN device is the same as the conventional TN device of Comparative Example 1 shown in FIG. 11 except that the material of the alignment films, the cell thickness, and the twist angle of the liquid crystal layer are different.

A transparent electrode made of ITO with a thickness of 1000 Å was formed on a glass substrate with a thickness of 1.1 mm. Then, SE-150 (manufactured by Nissan Chemical Industries, Ltd.) was applied to the transparent electrode to form an alignment film. The alignment film was then rubbed in one direction with Nylon cloth. Thus, the two substrates were fabricated. The thus-fabricated substrates were laminated together with 9 μm spacers therebetween so that the alignment directions of the alignment films form an angle of 240°, to form a liquid crystal cell.

Liquid crystal material ZLI-4427 (manufactured by Merck & Co., Inc.; containing chiral agent S811 to adjust the twist angle to 240°) was injected in the thus-fabricated liquid crystal cell. The resultant cell was heated and then gradually cooled. Polarizing plates having light absorption axes arranged in one direction were disposed on the opposite surfaces of the liquid crystal cell, aligning the direction with the orientation direction of liquid crystal molecules on the corresponding substrate. Thus, the conventional STN device was fabricated.

The liquid crystal display device of Example 4 according to the present invention is an STN device where the STN mode and the axial symmetric polarizing plate are combined (hereinafter, such a device is referred to as an "STN device with axial symmetric polarizing plates").

The STN device of this example was fabricated in the following manner.

A protection film wee formed on the axial symmetric polarizing plate fabricated by the method described in Example 1 or 2. A transparent electrode made of ITO was then formed on the protection film to obtain an electrode-attached axial symmetric polarizing plate. An alignment film is formed on the electrode-attached axial symmetric polarizing plate and subjected to the same alignment treatment as that in Comparative Example 2. The resultant axial symmetric polarizing plates were then laminated together with a predetermined space therebetween, aligning the polarization axes thereof. A liquid crystal material was injected in the space between the substrates, and the resultant cell was heated and then gradually cooled. Thus, the STN device with axial symmetric polarizing plates was fabricated.

The STN device with axial symmetric polarizing plates of this example has reduced tinting compared with the conventional STN device of Comparative Example 2, and thus it can be used as a device for black-and-white display without using a phase plate.

In Examples 3 and 4, the axial symmetric polarizing plate was combined with the TN mode and the STN mode liquid crystal cells. The liquid crystal display device can also be fabricated by combining the axial symmetric polarizing plate with the ECB mode liquid crystal cell. In such a case, the display with a rough texture observed in conventional ECB mode liquid crystal display devices can be improved.

EXAMPLE 5

In this example, a liquid crystal display device where the ECB mode and the axial symmetric polarizing plate are combined will be described, First, a conventional ECB mode liquid crystal display device (hereinafter, referred to as an "ECB device") will be described as Comparative Example 3.

The conventional ECB device is the same as the conventional TN device shown in FIG. 11 in the basic structure.

The conventional ECB device is fabricated in the following manner.

A transparent electrode made of ITO with a thickness of 1000 Å was formed on a glass substrate with a thickness of 1.1 mm. Then, AL-209 (manufactured by Nissan Chemical Industries, Ltd.) was applied to the transparent electrode to form a vertical alignment film. Thus, two substrates were fabricated. The thus-fabricated substrates were laminated together with 6 µm spacers therebetween to form a liquid crystal cell.

Liquid crystal material ZLI-4788-000 (manufactured by Merck & Co., Inc.) was injected in the thus-fabricated liquid crystal cell. The resultant cell was heated and then gradually cooled. Polarizing plates having light absorption axes arranged in one direction were disposed on the opposite surfaces of the liquid crystal cell so that the polarization axes of the two polarizing plates were perpendicular to each other. Thus, the conventional ECB device is fabricated. In the conventional ECB device, liquid crystal molecules fall in arbitrary directions when a voltage is applied. The apparent contrast therefore varies with positions depending on in which direction the liquid crystal molecules fall. This results in a rough texture of the resultant display.

The liquid crystal display device of Example 5 according to the present invention is an ECB device where the ECB mode and the axial symmetric polarizing plate are combined (hereinafter, such a device is referred,to as an "ECB device with axial symmetric polarizing plates").

The ECB device of this example was fabricated in the following manner.

A protection film was formed on the axial symmetric polarizing plate fabricated by the method described in Example 1 or 2. A transparent electrode made of ITO was then formed on the protection film to obtain an electrode-attached axial symmetric polarizing plate. An alignment film was formed on the electrode-attached axial symmetric polarizing plate and subjected to the same alignment treatment as that in Comparative Example 3. The resultant axial symmetric polarizing plates were then laminated together with a predetermined space therebetween, aligning the polarization axes thereof. A liquid crystal material was injected in the space between the substrates, and the resultant cell was heated and then gradually cooled. Thus, the ECB device with axial symmetric polarizing plates was fabricated.

In the ECB device with axial symmetric polarizing plates of this example, the apparent birefringence can be more or less averaged, and thus the rough texture is reduced compared with the conventional ECB device of Comparative Example 3.

In Examples 3 to 5 above, only spacers for defining the cell thickness are disposed between the substrates constituting the liquid crystal cell. Polymer walls can be formed in the liquid crystal layer of the liquid crystal cells in Examples 3 to 5 by using a technique recently developed by the inventors of the present inventions (see Japanese Laid-Open Patent Publication No. 6-301015). Such liquid crystal cells with polymer walls are highly durable to an external force.

EXAMPLE 6

In this example, a liquid crystal display device having polymer walls in a liquid crystal cell will be described.

Figure 14:
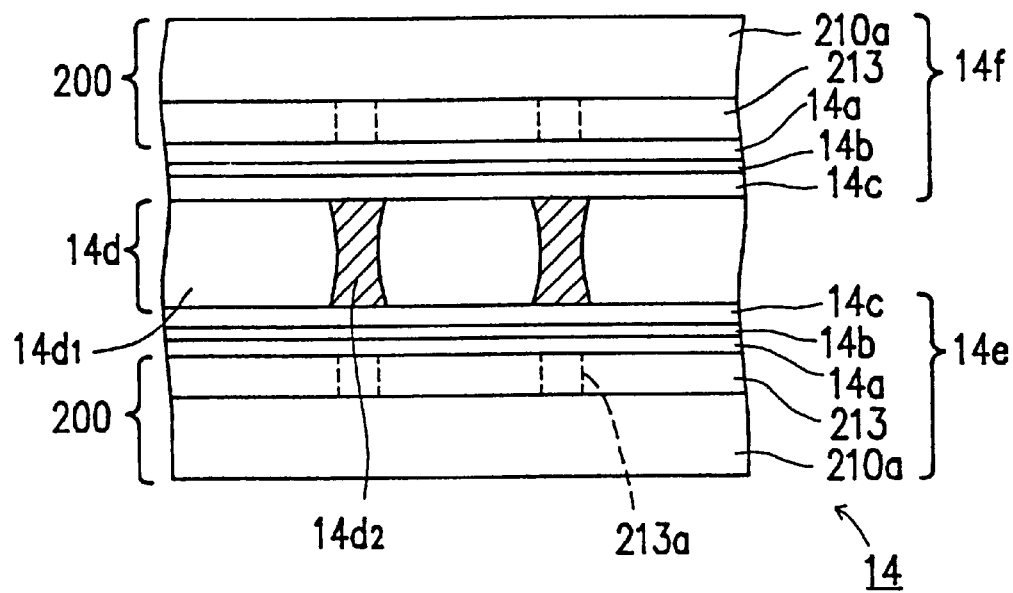
FIG. 14 is a sectional view showing a liquid crystal display device of Example 6 according to the present invention.

FIG. 14 is a sectional view of a liquid crystal cell of Example 6. Referring to FIG. 14, a liquid crystal display device 14 with axial symmetric polarizing plates of this example includes a pair of substrates 14e and 14f facing each other and a liquid crystal layer 14d having polymer walls 14$d_2$ formed therein. The liquid crystal display device of this example is of the TN mode as in Example 3. Each of the substrates 14e and 14f includes the axial symmetric polarizing plate 200 of Example 2 and a protection film 14a, a transparent electrode 14b made of ITO, and an alignment film 14c formed in this order on the surface of the axial symmetric polarizing plate 200 where the polarizing elements are formed. Liquid crystal regions 14$d_1$ of the liquid crystal layer 14d separated by the polymer walls 14$d_2$, are located to correspond to the respective polarizing elements 213. The axial symmetric polarizing plate 200 has partitions 213a defining the regions where the polarizing elements 213 are formed.

Thus, the liquid crystal display device 14 of this example having the polymer walls 14$d_2$ in the liquid crystal layer is more durable to an external force than the TN device of Example 3.

In Examples 7 to 11 below, liquid crystal display devices of a wide viewing angle display mode using the axial symmetric polarizing plate according to the present invention will be described.

A liquid crystal display device of the wide viewing angle display mode can be realized by combining the axial symmetric polarizing plate according to the present invention with the liquid crystal mode where liquid crystal molecules are oriented in at least two directions on at least one of the pair of substrates. The liquid crystal mode is roughly classified into two types: a randomly oriented type where liquid crystal molecules are oriented at random; and an axial-symmetrically oriented type where liquid crystal molecules are oriented axial-symmetrically.

The following liquid crystal display devices are known as the devices of the randomly oriented type liquid crystal display mode.

(1) A liquid crystal display device of a non-scattering type using a polarizing plate disclosed in Japanese Laid-open Patent Publication No. 5-27242, where polymer projections are formed in a liquid crystal cell by phase separation of a mixture of a liquid crystal material and a photocurable resin to disturb the orientation of liquid crystal molecules and thus to improve the viewing angle characteristics of the resultant liquid crystal display device.

(2) A liquid crystal display device where liquid crystal molecules are oriented at random by conducting no alignment treatment such as rubbing on alignment films formed an a pair of substrates.

(3) A liquid crystal display device including a polymer scattering type liquid crystal device. This liquid crystal device includes liquid crystal regions which are scattered in a resin and have different orientations of liquid crystal molecules. Such a liquid crystal device is sandwiched by two polarizing plates having absorption axes which are perpendicular to each other.

The above liquid crystal display devices (1) to (3) have a structure where the liquid crystal cell is sandwiched by the pair of polarizing plates in a crossed Nicols state. In such liquid crystal display devices, liquid crystal molecules (Δε>0: when the dielectric constant anisotropy is positive) are oriented along the electric field in the saturated voltage application state, exhibiting substantially the same black-level viewing angle characteristics dependency. Therefore, the viewing angle dependency obtained by the respective liquid crystal display devices exhibit substantially the same tendency, though the contrast differs depending on the display mode.

Figure 15A:
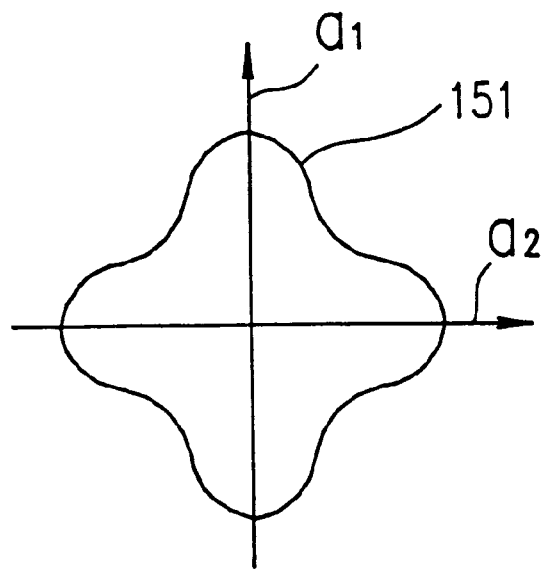
FIGS. 15A and 15B schematically illustrate the viewing angle characteristics of the liquid crystal display device.

FIG. 15A schematically illustrates a viewing angle characteristic by a contour contrast line 151 for the liquid crystal display device (2) above. From FIG. 15A, it is observed that the viewing angle is comparatively wide In axis directions $a_1$ and $a_2$ of the polarizing plates disposed on the upper and lower surfaces of the liquid crystal cell, but that the viewing angle characteristics are degraded in the 45° directions from the axis directions.

The devices (1) and (3) above have substantially the same characteristics. The viewing angle characteristics can be improved by combining the devices (1) to (3) with the axial symmetric polarizing plate according to the present invention. More specifically, the liquid crystal cell with the axis symmetric polarizing plates having polarizing planes perpendicular to each other attached thereto is fixed, while the axial symmetric polarizing plates are rotated. The average of the transmittances of the liquid crystal cell measured under this state is exhibited as the viewing angle characteristics of the resultant liquid crystal display device. As a result, the omnidirectionally uniform viewing angle characteristics as represented by a contour contrast line 152 in FIG. 15B can be obtained.

In the device (3), which is disclosed in Japanese Laid-Open Patent Publication No. 6-324337, a large amount of polymers are included in the device (pixels). This results in cloud display due to a scattering phenomenon at the interface between the liquid crystal material and the polymer. Moreover, since de-polarization due to the light scattering phenomenon is utilized in principle, the light utilization efficiency is as low as 50% at maximum theoretically for incident light.

EXAMPLE 7

In this example, a liquid crystal display device obtained by combining the non-rubbing mode and the axial symmetric polarizing plate will described.

First, a conventional non-rubbing mode liquid crystal display device (hereinafter, referred to as an "amorphous TN device") will be described as Comparative Example 4.

The amorphous TN device of Comparative Example 4 is the same as the TN device of Comparative Example 1 shown in FIG. 11 in the basic structure.

The amorphous TN device of Comparative Example 4 is fabricated in the following manner.

A transparent electrode made of ITO with a thickness of 1000 Å was formed on each of a pair of glass substrates with a thickness of 1.1 mm. A polyimide film was formed on the transparent electrode to form a pair of substrates without rubbing. The thus-fabricated substrates were laminated together with 5 μm spacers therebetween to form a liquid crystal cell.

Liquid crystal material ZLI-4792 (manufactured by Merck & Co., Inc.; adjusted with chiral agent S-811 to obtain a helical pitch of 90°), was injected in the thus-fabricated liquid crystal cell. The resultant cell was heated and then gradually cooled. Polarizing plates of which light absorption axes were arranged in one direction were disposed on the opposite surfaces of the liquid crystal cell so that the polarization axes of the two polarizing plates were perpendicular to each other. Thus, the conventional amorphous TN device was fabricated.

In the conventional amorphous TN device, liquid crystal molecules in the liquid crystal cell are oriented at random since the alignment influence of the substrates is low. Accordingly, the viewing angle characteristics at the gray-scale level are excellent. Thus, the viewing angle characteristics of the conventional amorphous TN device is excellent in the polarization axis directions of the polarizing plate as in Comparative Example 1, but degraded in the 45° directions from the polarization axes.

The liquid crystal display device of Example 7 according to the present invention is an amorphous TN device where the non-rubbing mode and the axial symmetric polarizing plate are combined (hereinafter, such a device is referred to as an "amorphous TN device with axial symmetric polarizing plates").

The amorphous TN device of this example was fabricated in the following manner.

A protection film was formed on the axial symmetric polarizing plate fabricated by the method described in Example 1 or 2. A transparent electrode made of ITO was then formed on the protection film to obtain an electrode-attached axial symmetric polarizing plate. The thus-fabricated two axial symmetric polarizing plates were not subjected to the alignment treatment as in Comparative Example 4, but they were laminated together aligning the polarization axes of the two axial symmetric polarizing plates with each other, to form a liquid crystal cell. A liquid crystal material was injected in the liquid crystal cell, and the resultant cell was heated and then gradually cooled. Thus, the amorphous TN device with axial symmetric polarizing plates was fabricated.

The thus-fabricated liquid crystal display device exhibited the completely axial symmetrical viewing angle characteristics due to the effect of the axial symmetric polarizing plates. That is, the viewing angle characteristics shown in FIG. 15B were obtained.

In Examples 8 to 11 below, the combination of the liquid crystal modes where liquid crystal molecules are oriented axial symmetrically on substrates and the axial symmetric polarizing plate will be described.

An example of the wide viewing angle display mode where the orientation of liquid crystal molecules on substrates is regular is an axial symmetric orientation mode where major axes of the liquid crystal molecules are oriented axial symmetrically. Examples of the conventional liquid crystal display devices of the axial symmetric orientation liquid crystal mode are as follows.

(4) A liquid crystal display device where liquid crystal molecules are oriented omnidirectionally uniform in each pixel region. Specifically, the liquid crystal molecules are oriented spirally and twisted by 90° between the upper and lower substrates. In other words, the directions of the spiral on the upper and lower substrates are reversed from each other. In this liquid crystal display device, the liquid crystal molecules behave as in the TN mode device where the direction of the spiral-shaped orientation varies by controlling the liquid crystal molecules with a voltage. Also, since liquid crystal regions in the liquid crystal cell are substantially surrounded with polymer walls, it is highly durable to an external force.

The generation of disclination lines can be reduced by appropriately selecting the resin material constituting the polymer wells, realizing high contrast.

(5) A liquid crystal display device of the wide viewing angle display mode where alignment films has a spherulite structure composed of a crystalline polymer, and thus has a large axial symmetric alignment influence over the liquid crystal layer.

(6) A liquid crystal display device of the wide viewing angle display mode where narrow grooves are formed on a pair of substrates so that liquid crystal molecules are oriented concentrically on one of the pair of substrates and radially on the other substrate.

The above liquid crystal display devices (4) to (6) also have the problem with regard to the viewing angle characteristics which occurs in the above-described display devices of the uniaxially oriented liquid crystal mode. That is, the viewing angle characteristics in the 45° directions from the polarization axes of the polarizing plate are poor. The viewing angle characteristics can be improved as in the above cases by using the axial symmetric polarizing plate according to the present invention.

In particular, when the polarization axes of the axis symmetric polarizing plate and the major axes of liquid crystal molecules oriented axial-symmetrically are identical on the substrates, the viewing angle characteristics in the direction at right angles from the display plane are the same in principle with the characteristic of the TN mode liquid crystal display device using a pair of crossed Nicols polarizing plates having polarization axes arranged in one direction. Moreover, the liquid crystal display device of the axial symmetric mode is especially preferable because it has omnidirectionally uniform viewing angle characteristics.

Japanese Laid-Open Patent Publication No. 6-324337 discloses the liquid crystal display device (6) combined with a pair of polarizing plates of which polarization axes are arranged concentrically and radially. Since narrow grooves are formed on the substrates of this liquid crystal display device to align liquid crystal molecules, it is not possible to control pretilt nor reduce the generation of disclination lines. High contrast is therefore not expected. Moreover, liquid crystal molecules may move in the liquid crystal cell by application of an external force, changing the orientation of the liquid crystal molecules. In such a case, the axial symmetric orientation is no more retained. It is concluded, therefore, that the liquid crystal display device (4) combined with the axial symmetric polarizing plates is most preferable.

EXAMPLE 8

A liquid crystal display device combining an axial symmetrical aligned microcell (ASM) mode and the axial symmetric polarizing plate will be described as Example 8 according to the present invention.

First, a conventional ASM mode liquid crystal display device (hereinafter, referred to as an "ASM device") will be described as Comparative Example 5.

Figure 16:
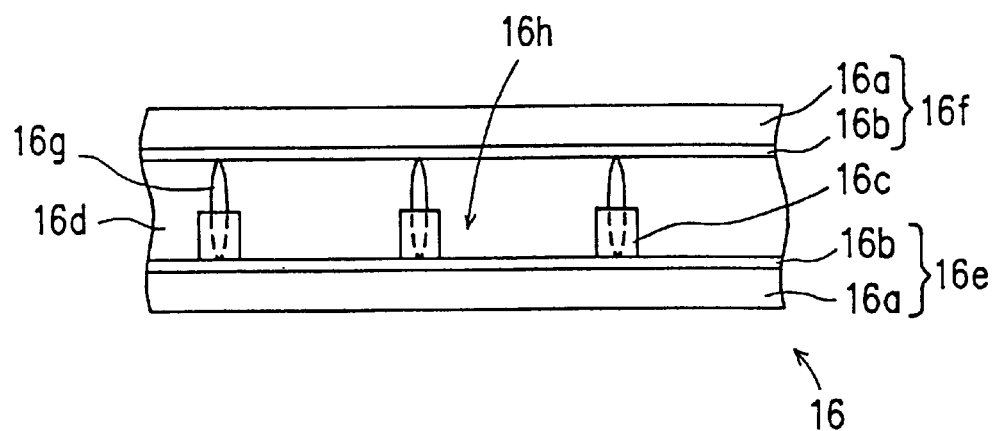
FIG. 16 is a sectional view showing a conventional ASM device (Comparative Example 5).

FIG. 16 is a sectional view showing the structure of the conventional ASM device. Referring to FIG. 16, an ASM device 16 includes a pair of substrates 16e and 16f disposed to face each other with a predetermined space therebetween and a liquid crystal material 16d injected in the space between the substrates 16e and 16f. The substrate 16e includes a glass substrate 16a and a transparent electrode 16b formed on a surface of the substrate 16a. Partitions 16c are formed on the transparent electrode 16b for dividing the surface area into a plurality of pixel regions 16h using a photoresist. Each partition 16c has a spacer 16g inserted therein to ensure a predetermined cell thickness. The substrate 16f includes a glass substrate 16a and a transparent electrode 16b formed thereon.

The above ASM device 16 of Comparative Example 5 is fabricated in the following manner.

The transparent electrode.16b made of ITO with a thickness of 1000 Å was formed on each of the glass substrates 16a and 16b, to fabricate the pair of substrates 16e and 16f. A photoresist OMR-83 (Tokyo Ohke Kogyo Co., Ltd.) was applied to the substrate 16e to form the partitions 16c. The 5 µm spacer 16g was inserted in each partition 16c. The substrates 16e and 16f were then laminated together with the space corresponding to the spacers 16g therebetween to ensure the cell thickness, thus to form a liquid crystal cell.

The following ingredients were uniformly mixed and the resultant mixture was injected in the cell under vacuum. The ingredients include R684 (manufactured by Nippon Kayaku Co., Ltd.) (0.025 g), p-phenylstyrene (0.025 g), a compound A (0.015 g) represented by Formula (1) below, liquid crystal material ZLI-4792 (manufactured by Merck & Co., Inc.; Δn-0.094; adjusted with chiral agent S-811 to obtain a twist angle of 90°) (0.935 g), and an photo-initiator Lucirin TPO (manufactured by BASF; having light absorption maximum at around 400 nm) (0.005 g).

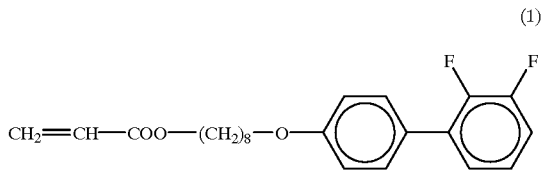

(1)

Thereafter, the cell was heated to 100° C. (more than the averaged temperature) for 30 minutes and then gradually cooled to 40° C.

The cell was then processed to have liquid crystal domains each corresponding to one pixel region, and liquid crystal molecules in each liquid crystal domain corresponding to one pixel region were oriented axial symmetrically by applying a voltage. Then, the liquid crystal domains were grown under this state to complete the cell.

When each liquid crystal domain with the axial symmetric orientation has expanded to the size of each pixel region, the cell was irradiated with light having an intensity of 2 mW/cm$^2$ and a wavelength of 355 nm from a high-pressure mercury lamp for 20 minutes. Thereafter, the cell was cooled to room temperature and then irradiated again with light with an intensity of 5 mW/cm$^2$ and a wavelength of 365 nm from the high-pressure mercury lamp for five minutes.

Figure 17:
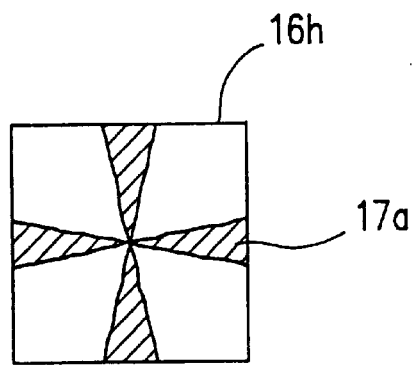
FIG. 17 shows the results of the observation of the viewing angle characteristics of the ASM device of Comparative Example 6 with a polarizing microscope.

The thus-fabricated cell was observed with a polarizing microscope. As a result, as shown in FIG. 17, a extinction pattern 17a was observed as well as the liquid crystal regions 15h formed according to the photoresist pattern. It was confirmed that the liquid crystal molecules were oriented axial symmetrically around the center axis.

Two polarizing plates having polarization axes perpendicular to each other were then disposed on the upper and lower surfaces of the liquid crystal cell to complete the conventional liquid crystal display device. As for the electro-optic characteristics of the thus-fabricated liquid crystal display device, though the axial symmetric orientation was established, anisotropy was observed in the 45° directions from the polarization axes of the polarizing plates, as shown in FIG. 15A. Black level floating was observed in the saturated voltage application state, and the display was degraded in directions 40° or more from the vertical plane.

Figure 18A:
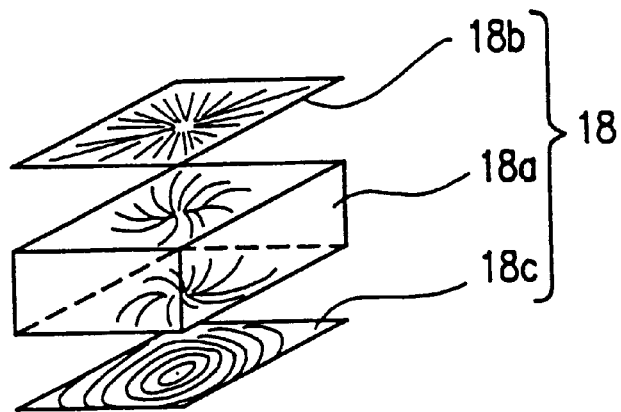
FIGS. 18A and 18B illustrate a liquid crystal display device of Example 8 according to the present invention, i.e., an ASM device obtained by combining the ASM mode and the axial symmetric polarizing plate.
Figure 18B:
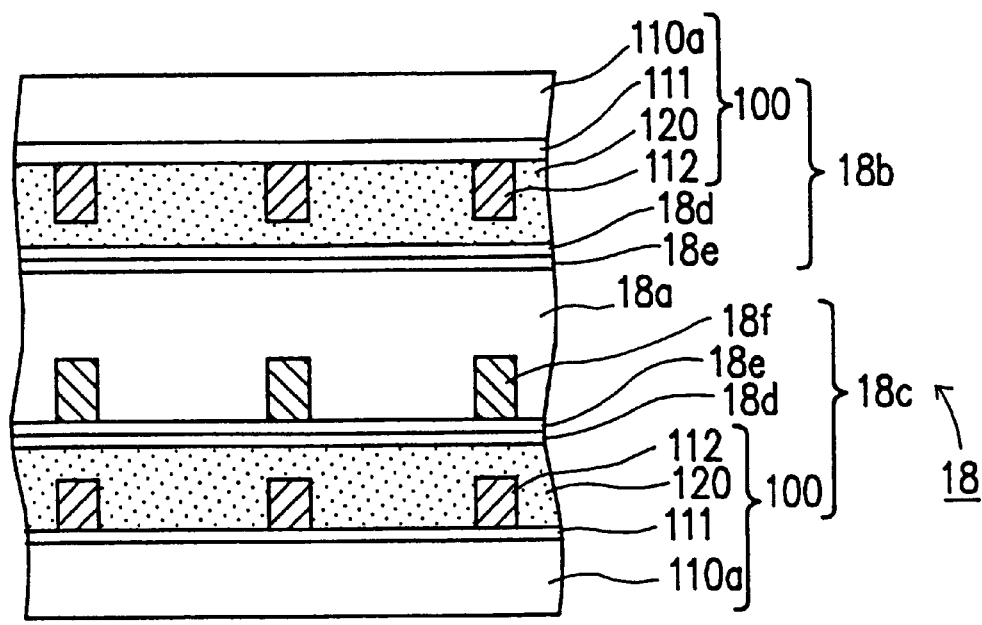

FIGS. 18A and 18B show the liquid crystal display device of Example 8 according to the present invention, which is an ASM device where the ASM mode and the axial symmetric polarizing plate are combined (hereinafter, such a device is referred to as an "ASM device with axial symmetric polarizing plates"). FIG. 18A schematically shows the structure of the ASM device with axial symmetric polarizing plates, and FIG. 18B is a sectional view thereof.

Referring to FIGS. 18A and 18B, an ASM device with axial symmetric polarizing plates includes a pair of upper and lower substrates 18b and 18c facing each other and a liquid crystal layer 18a therebetween.

The lower substrate 18c includes the axial symmetric polarizing plate 100 fabricated by the method described in Example 1. A protection film 18d and a transparent electrode 18e made of ITO are formed on the polymer layer 120 of the axial symmetric polarizing plate 100. Partitions 18f are formed on the transparent film 18e of the lower substrate 18c to divide the surface area of the transparent film 18e into a plurality of pixel regions. The partitions 18f correspond to the partitions 112 formed in the axial symmetric polarizing plate 100.

The upper substrate 18b includes the axial symmetric polarizing plate 100 fabricated by the method described in Example 1. A protection film 18d and a transparent electrode 18e made of ITO are formed on the polymer layer 120 of the axial symmetric polarizing plate 100. Liquid crystal molecules in the liquid crystal layer 18a are oriented in a counterclockwise spiral shape as is viewed from top on the side of the upper substrate 18b, while they are oriented in a clockwise spiral shape as is viewed from top on the side of the lower substrate 18c.

The axial symmetric polarizing plate fabricated by the method described in Example 2 can also be used for the upper and lower substrates 18b and 18c.

The ASM device 18 with axial symmetric polarizing plates of this example is fabricated in the following manner.

The axial symmetric polarizing plates were fabricated according to the method described in Example 1, except that 295PA (manufactured by Nippon Steel Chemical Co., Ltd.) was used as the photoresist material for forming the partitions in this example and was made thicker than that in Example 1. The protection film 18d was formed on each of the axial symmetric polarizing plate 100, and the transparent electrode 18e made of ITO was formed on the protection film 18d, to obtain two electrode-attached axial symmetric polarizing plates. The partitions 18f were formed on one of the electrode-attached axial symmetric polarizing plates. Thus, the upper substrate 18b without partitions and the lower substrate 18c including the partitions were fabricated.

The substrates 18b and 18c were then laminated together aligning the polarization axes of the axial symmetric polarizing plates 100 of the substrates 18b and 18c, i.e., aligning the centers of the axial symmetric arrangement of the polarization axes of the substrates 18b and 18c, to form the liquid crystal cell. The mixture of the liquid crystal material and the photocurable resin was injected in the liquid crystal cell. Thus, the ASM device with axial symmetric polarizing plates was fabricated.

Figure 15B:
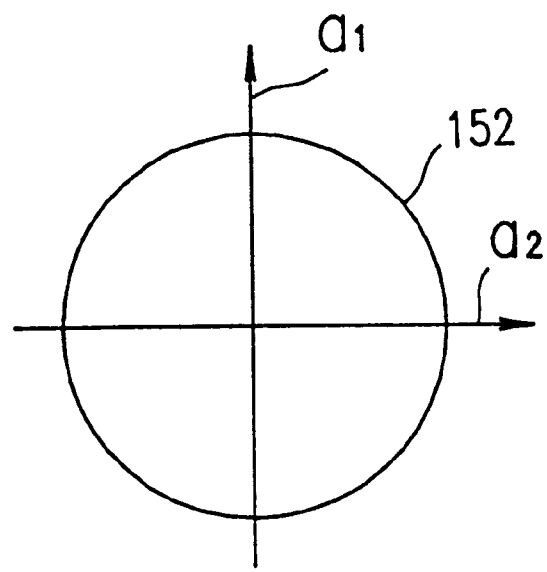

The thus-fabricated ASM device of this example exhibited the completely axial symmetrical viewing angle characteristics as shown in FIG. 15B due to the effect of the axial symmetric polarizing plates.

In the ASM device of this example, the orientation directions of the liquid crystal molecules on the sides of the upper and lower substrates and the arrangement directions of the polarization axes of the upper and lower axial symmetric polarizing plates are not completely the same. If they are the same, the transmittance in the front direction can be improved.

EXAMPLE 9

In this example, an ASM device where the orientation directions of liquid crystal molecules on the surfaces of the substrates and the arrangement directions of the polarization axes of the axial symmetric polarizing plates are the same will be described.

Figure 19A:
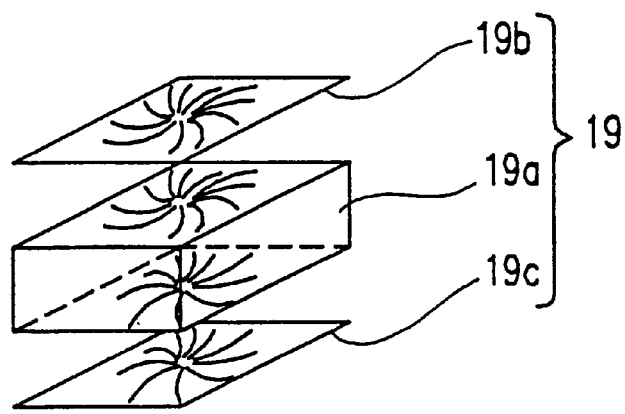
FIGS. 19A and 19B illustrate a liquid crystal display device of Example 9 according to the present invention, i.e., an ASM device obtained by combining the ASM mode and the axial symmetric polarizing plate.
Figure 19B:
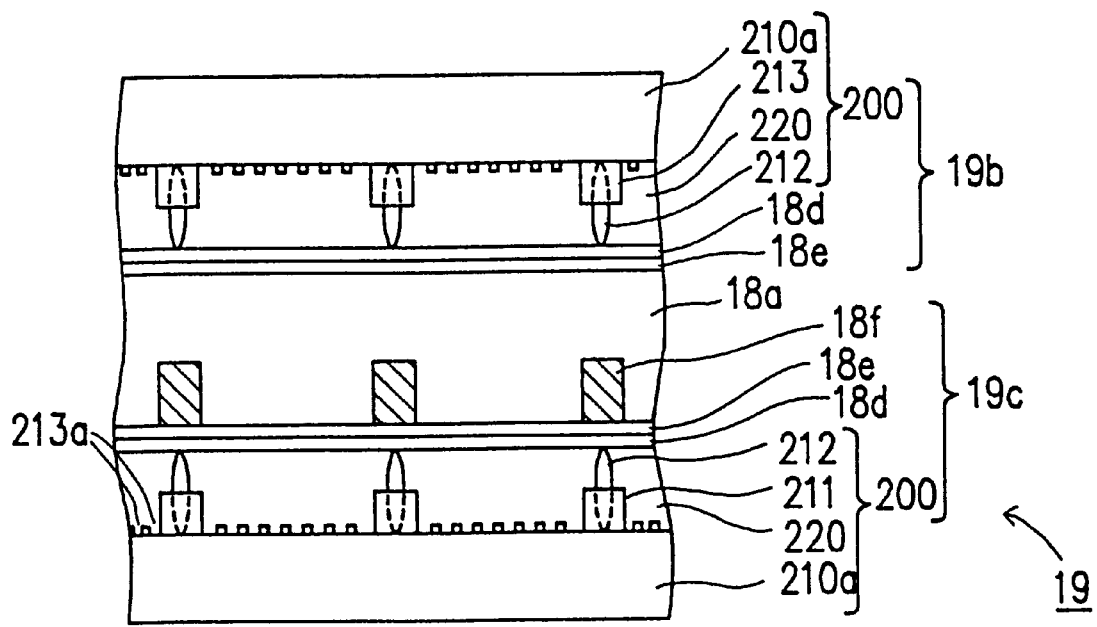

FIGS. 19A and 19B show the liquid crystal display device of Example 9 according to the present invention, which is an ASM device where the ASM mode and the axial symmetric polarizing plate are combined. FIG. 19A schematically shows the structure of the ASM device with axial symmetric polarizing plates, and FIG. 19D is a sectional view thereof.

Referring to FIGS. 19A and 19B, an ASM device 19 with axial symmetric polarizing plates includes a pair of upper and lower substrates 19b and 19c facing each other and a liquid crystal layer 19a therebetween.

The lower substrate 19c includes the axial symmetric polarizing plate 200 fabricated by the method described in Example 2, where the polarization axes are arranged in a clockwise spiral shape. A protection film 18d and a transparent electrode 18e made of ITO are formed on the polymer layer 220 of the axial symmetric polarizing plate 200, as in Example 8. Partitions 18f are formed on the transparent film 18e of the lower substrate 19c to divide the surface area of the transparent film 18e Into a plurality of pixel regions. The partitions 18f correspond to the partitions 211 forced in the axial symmetric polarizing plate 200.

The upper substrate 19b includes the axial symmetric polarizing plate 200 fabricated by the method described in Example 2 where the polarization axes are arranged in a clockwise spiral shape. A protection film 18d and a transparent electrode 18e made of ITO are formed on the polymer layer 220 pf the axial symmetric polarizing plate 200. Liquid crystal molecules in the liquid crystal layer 18a are oriented in a counterclockwise spiral shape as is viewed from top on the side of the upper substrate 19b, while they are oriented in a clockwise spiral shape as is viewed from top on the side of the lower substrate 19c.

The axial symmetric polarizing plate fabricated by the method described in Example 1 can also be used for the upper and lower substrates 19b and 19c.

Figure 20A:
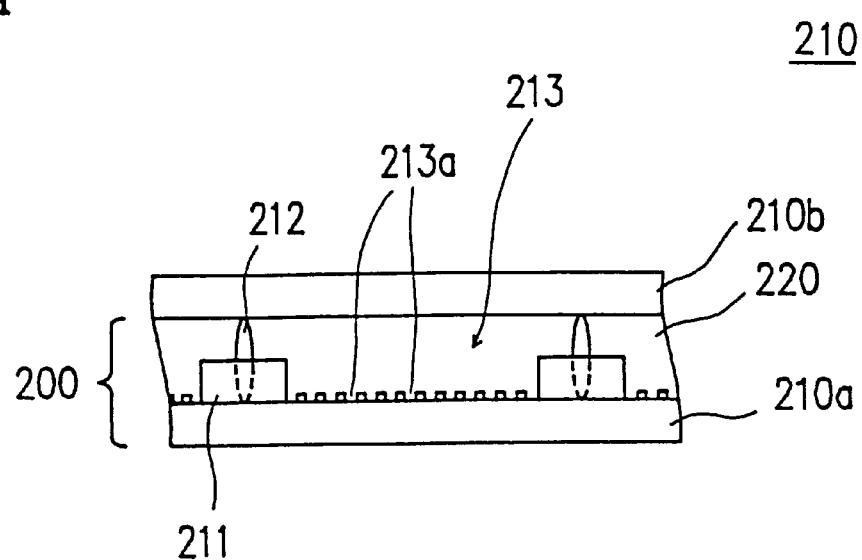
FIGS. 20A and 20B illustrate a cell structure for fabricating the axial symmetric polarizing plate constituting the ASM device of Example 9.
Figure 20B:
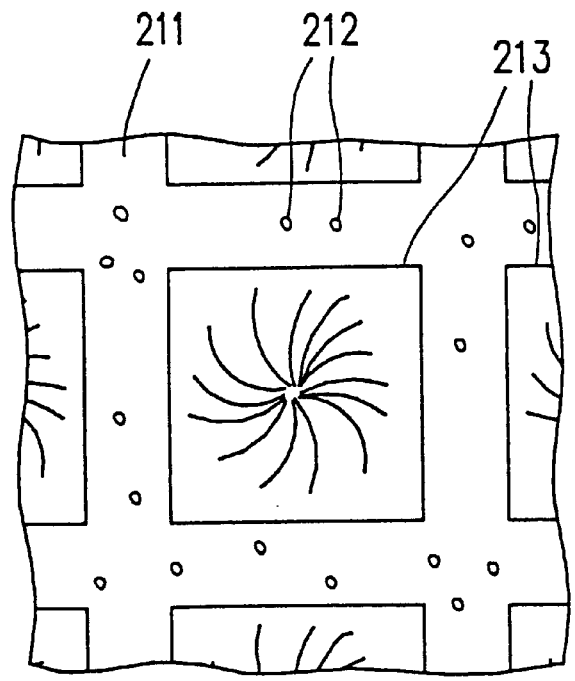

FIGS. 20A and 20B are a sectional view and a plan view, respectively, illustrating the cell for fabricating the axial symmetric polarizing plate of the ASM device of this example.

Referring to FIGS. 20A and 20B, a cell 210 for axial symmetric polarizing plate fabrication includes a pair of upper and lower substrates 210b and 210a disposed to face each other with a predetermined distance therebetween. Partitions 211 are formed on the upper surface of the lower substrate 210a for dividing the surface area into a plurality of pixel regions 213. Spacers 212 for defining the cell thickness, i.e., the distance between the substrates are inserted in the respective partitions 211. Narrow grooves 213a are formed on the surface of each pixel region 213 in a counterclockwise spiral shape. The curve of each narrow groove 213a is designed so that the tangent thereof forms an angle of 45° with respect to the straight line extending radially from the center of the spiral.

The ASM device 19 with axial symmetric polarizing plates of this example is fabricated in the following manner.

The upper substrate 210b and the lower substrate 210a with the narrow grooves 213a formed on the surface thereof were laminated together with the distance defined by the spacers 212 therebetween, to obtain the cell for axial symmetric polarizing plate fabrication. Using the cell, the axial symmetric polarizing plate 200 was fabricated as described in Example 2.

The protection film 18d was formed on each of the axial symmetric polarizing plate 200, and the transparent electrode 18e made of ITO was formed on the protection film 18d, to obtain two electrode-attached axial symmetric polarizing plates. The partitions 18f were formed on one of the electrode-attached axial symmetric polarizing plates. Thus, the upper substrate 19b without partitions and the lower substrate 19c including the partitions were fabricated.

The substrates 19b and 19c were then laminated together aligning the polarization axes of the axial symmetric polarizing plates 200 of the substrates 19b and 19c, i.e., aligning the centers of the axial symmetric arrangement of the polarization axes of the substrates 19b and 19c, to form the liquid crystal cell. The mixture of the liquid crystal material and the photocurable resin was injected in the liquid crystal cell. Thus, the ASM device 19 with axial symmetric polarizing plates was fabricated.

The thus-fabricated ASM device of this example exhibited the completely axial symmetrical viewing angle characteristics as shown in FIG. 15B due to the effect of the axial symmetric polarizing plates.

In this example, since the orientation directions of the liquid crystal molecules on, the substrates and the directions of the polarization axes of the polarizing plates are substantially the same, the transmittance of the display plane in the front direction is as high as 96% in the TN ratio.

In the liquid crystal display devices of Examples 3 to 9 above, the axial symmetric polarizing plates are used This may cause axis displacement when the viewing angle is changed. To prevent this trouble, the liquid crystal display device is preferably fabricated so that the polymer layer constituting the polarizing elements is located on the inner side of the liquid crystal cell, i.e., the side closer to the liquid crystal layer with respect to the glass substrate.

EXAMPLE 10

In Example 10, another example of the ASM device where the orientation directions of liquid crystal molecules on the substrates and the arrangement directions of the polarization axes of the axial symmetric polarizing plates are the same will be described.

Figure 21A:
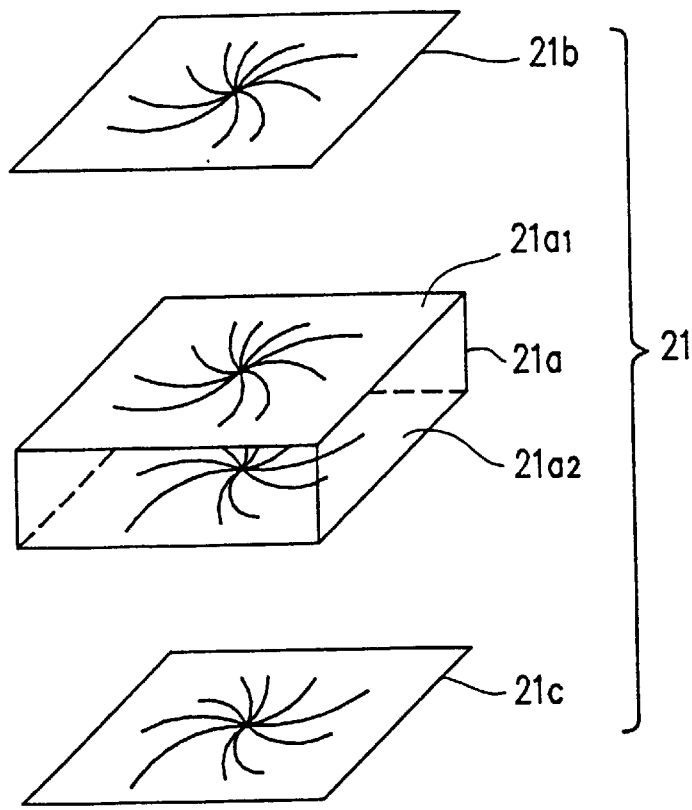
FIGS. 21A and 21B illustrate a liquid crystal display device of Example 10 according to the present invention, i.e., an ASM device obtained by combining the ASM mode and the axial symmetric polarizing plate.
Figure 21B:
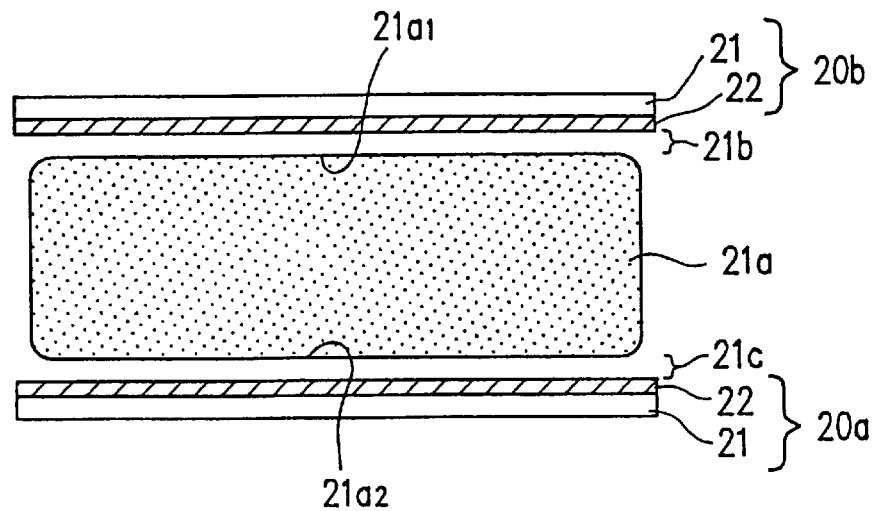
Figure 24A:
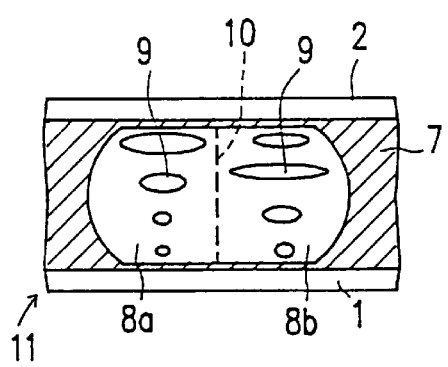
FIGS. 24A to 24F illustrate the principle for the improvement in the viewing angle characteristics of the liquid crystal display device.
Figure 24D:
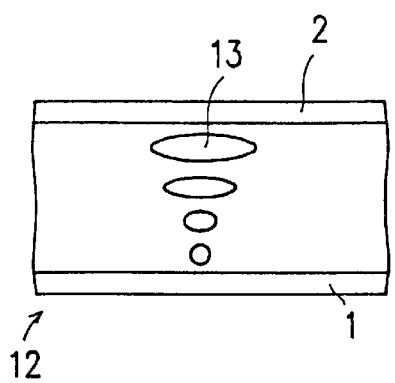
Figure 24B:
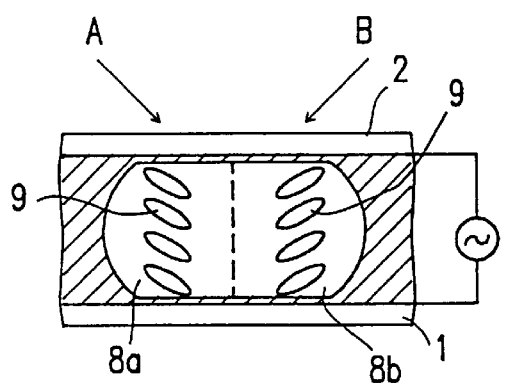
Figure 24E:
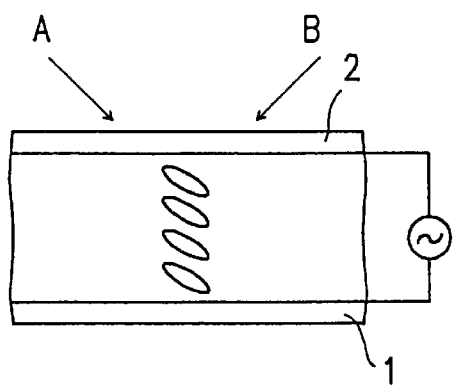
Figure 24C:
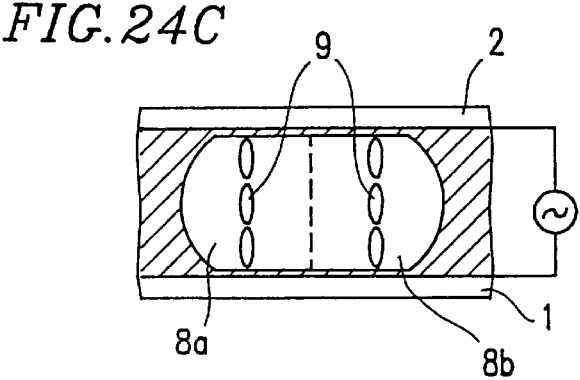
Figure 24F:
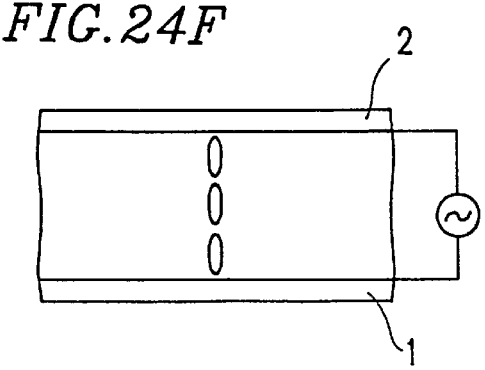

FIGS. 21A and 21B show the liquid crystal display device of Example 10 according to the present invention, which is an ASM device where the ASM mode and the axial symmetric polarizing plate are combined. FIG. 21A schematically shows the structure of the ASM device; with axial symmetric polarizing plates, and FIG. 21B is a sectional view thereof.

Referring to FIGS. 21A and 21B, an ASM device 21 with axial symmetric polarizing plates includes a liquid crystal layer 21a and axial symmetric polarizing plates 21b and 21c disposed on the upper and lower surfaces of the liquid crystal layer 21a.

The axial symmetric polarizing plates 21b and 21c are formed integrally with a pair of upper and lower substrates 20b and 20a. More specifically, the upper substrate 20b includes a transparent substrate 21 made of glass and the like and a transparent electrode 22 made of ITO and the axial symmetric polarizing plate 21b formed in this order on the transparent substrate 21. Likewise, the lower substrate 20a includes a transparent substrate 21 made of glass and the like and a transparent electrode 22 made of ITO, a photoresist film 23 of a predetermined pattern (see FIGS. 22A to 22C), and the axial symmetric polarizing plate 21c formed in this order on the transparent substrate 21.

Liquid crystal molecules in an upper region $21a_1$, of the liquid crystal layer 21a are oriented in a counterclockwise spiral shape as is viewed from top, while liquid crystal molecules in a lower region $21a_2$ of the liquid crystal layer $21_a$ are oriented in a clockwise spiral shape as is viewed from top.

The method for fabricating the liquid crystal display device of this example will be described with reference to FIGS. 22A to 22C.

The photoresist film 23 of a lattice-shaped planar pattern was formed on the transparent electrode 22 on the transparent substrate 21 using a photoresist (OMR83; manufactured by Tokyo Ohka Kogyo Co., Ltd.). As shown in FIG. 22C, the photoresist film 23 is composed of a sub-resist film 23a of a wide lattice-shaped planar pattern and a sub-resist film 23b of a narrow lattice-shaped planar pattern. The patterns of these sub-resist films 23a and 23b are the same though the width of the lattice is different. The pattern of the sub-resist film 23b is formed on the pattern of the sub-resist film 23a. Beads 23c with a diameter of 5 μm was previously scattered on the transparent electrode 22 in correspondence with the pattern of the photoresist film 23 so as not to exist outside the photoresist film 23.

The substrate 20a with the photoresist pattern formed thereon and the substrate 20b including the transparent substrate 21 and the transparent electrode 22 were laminated together to obtain a cell.

A mixture of liquid crystal material ZLI-4792 (containing a chiral agent 0.935 g to adjust the chiral pitch to obtain 90° twist in the cell), polymerizable liquid crystal material A (0.015 g), photo-initiator Irgacure 651 (manufactured by Chiba-Geigy Ltd.) (0.005 g), a polymerizable dichroic dye (0.005 g), and polymerizable suppressant biphenylstyrene (0.025 g) was injected in the cell. The formula of the polymerizable liquid crystal material A is the same as Formula (1) above.

The cell was then processed to have liquid crystal domains each corresponding to one pixel region, and liquid crystal molecules in each liquid crystal domain corresponding to one pixel region were oriented axial symmetrically by applying a voltage. Then, the liquid crystal domains were grown under this state to complete the cell.

Thereafter, the cell is irradiated with light with a wavelength of 365 nm and an energy of 3 mW/cm$_2$ for 20 minutes using an ultraviolet irradiation apparatus.

The thus-fabricated liquid crystal cell has very thin polymer layers on the surfaces of the substrates 20a and 20b as shown in FIG. 21B. The dichroic dye molecules incorporated in the polymer are included in the polymer layers. The absorption axes of the dichroic dye molecules are arranged spirally and the absorption axes on the upper and lower substrates are perpendicular to each other. In other words, the polymer layers formed on the surfaces of the substrates 20a and 20b constitute the axial symmetric polarizing plates 21c and 21b, respectively.

Thus, in this example, the axial symmetric polarizing plates are automatically formed simultaneously with the formation of the liquid crystal cell. This makes it possible to omit the process of disposing the polarizing plates on the liquid crystal cell after the fabrication of the liquid crystal cell. Since the axial symmetric polarizing plates are formed inside the liquid crystal cell, no parallax occurs. Since the axial symmetric polarizing plates are formed simultaneously with the alignment of the liquid crystal molecules, no displacement occurs at all between the major axis of the liquid crystal (symmetric axis of the axial symmetric orientation) and the polarization axis of the axial symmetric polarizing plate. Thus, an ASM device with excellent viewing angle characteristics can be obtained.

The viewing angle characteristics of the ASM device of this example are completely isotropic omnidirectionally. This completely isotropic omnidirectional viewing angle characteristics are represented by a contour contrast line 231 as shown in FIG. 23. Further, in this example, the major axis of the liquid crystal and the absorption axis of the axial symmetric polarizing plate correspond to each other, and moreover the dichroic dye used in this example is polymerizable, allowing most dye molecules to be incorporated in the polymer. Accordingly, the resultant transmittance is substantially the same as that obtained by the TN mode (when no voltage is applied).

EXAMPLE 11

A liquid crystal display device combining the spherulite mode and the axial symmetric polarizing plate will be described as Example 11 according to the present invention.

First, a conventional spherulite mode liquid crystal display device (hereinafter, referred to as a "spherulite mode device") will be described as Comparative Example 6.

The spherulite mode device of Comparative Example 6 is fabricated in the following manner.

A transparent electrode made of ITO with a thickness of 1000 Å was formed on each of two glass substrates with a thickness of 1.1 mm. The resultant glass substrates were coated with Nylon 66 by spin coating. In this way, two substrates each having a thin film of a spherulite structure formed on the glass substrate were fabricated. The thus-fabricated two substrates were laminated together with 5 μm spacers interposed therebetween to ensure the cell thickness, thereby to form a cell for polarizing plate fabrication. Liquid crystal material ZLI-4792 (manufactured by Merck & Co., Inc.; adjusted with chiral agent S-811 to obtain a helical pitch of 90°) was then injected in the cell. The resultant cell was heated and then gradually cooled. A pair of polarizing plates having polarization axes perpendicular to each other were disposed on the opposite surfaces of the liquid crystal cell. The polarizing plates used in this example has light absorption axes arranged in one direction. Thus, the spherulite mode device using thin films of the spherulite structure as the alignment films was fabricated.

In the liquid crystal cell of the spherulite mode device, liquid crystal molecules are oriented spirally along the spherulite structures of the thin films on the surface of the substrates. The spherulite mode device is therefore excellent in the viewing angle characteristics in the gray-scale state. However, anisotropy is generated in the viewing angle characteristics in the 45° directions from the polarization axes as shown in FIG. 15A due the same reason described in Comparative Example 4.

The spherulite mode device of this example combining the spherulite mode and the axial symmetric polarizing plate is fabricated in the following manner.

A protection film was formed on each of the two axial symmetric polarizing plates fabricated in Example 1 or 2. Then, a transparent electrode made of ITO was formed on the protection film to form an electrode-attached axial symmetric polarizing plate. The thus-fabricated two electrode-attached axial symmetric polarizing plates were subjected to alignment treatment as in Comparative Example 6, and then thin films of the spherulite structure were formed on the resultant polarizing plates. The liquid crystal material was injected in the cell. The resultant cell was heated and then gradually cooled. Thus, the spherulite mode device with axial symmetric polarizing plates of this example was fabricated.

The thus-fabricated spherulite mode device of this example exhibited the completely axial symmetry as shown in FIG. 15B due to the effect of the axial symmetric polarizing plates.

In this example, as in examples 3 to 9, the axial symmetric polarizing plates are used. This may cause axis displacement when the viewing angle is changed. To prevent this trouble, the liquid crystal display device is preferably fabricated so that the polymer layer constituting the polarizing elements is located on the inner side of the liquid crystal cell, i.e., the side closer to the liquid crystal layer with respect to the glass substrate. The driving method for the liquid crystal display devices of Examples 3 to 11 is not limited to the simple matrix driving, but other driving methods such as the active matrix driving using active elements such as a-Si TFTs, p-Si TFTs, and MIMs can be used. In short, the driving method for the liquid crystal display device according to the present invention is not specifically limited.

As the substrates constituting the axial symmetric polarizing plate, glass, polymer films and the like can be used as transparent material. A substrate with a metal thin film for a reflective device, an Si substrate, and the like can be used as opaque material.

As the plastic substrate, a material which does not have absorption for visible light is preferable. PET, acrylic polymers, styrene, polycarbonate, and the like can be used.

A liquid crystal cell formed of two substrates of different types can also be fabricated by combining the above types of substrates. Also, two substrates of the same type or different types with different thicknesses can also be used.

When a plastic substrate is used, the polarizing plate can be integrated with the transparent substrate by providing the substrate with the polarization capability.

Thus, according to the present invention, an axial symmetric polarizing plate which can be easily fabricated with good reproducibility is provided.

A liquid crystal display device with improved viewing angle characteristics are provided by combining the conventional liquid crystal display modes with the axial symmetric polarizing plate.

A liquid crystal display device where the viewing angle characteristics are uniform omnidirectionally due to the isotropic polarization of the axial symmetric polarizing plate for omnidirectional incident light is realized. Such a liquid crystal display device can be used as a plane display which is comparable to CRTs.

The liquid crystal display device according to the present invention can be used as a wide high-precision liquid crystal display device and a display device for a portable information terminal unit by utilizing the viewing angle characteristics as described above. In particular, the device can be used effectively when used as the liquid crystal display device viewed by several users simultaneously.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An axial symmetric polarizing plate including at least one portion where light transmission easy axes are arranged with axial symmetry so that light transmission for incident light is equivalent omnidirectionally in one plane, wherein the axial symmetric polarizing plate contains at least a dichroic dye fixed in a polymer matrix formed of a polymerized liquid crystal material.

2. An axial symmetric polarizing plate according to claim 1, wherein the axial symmetric polarizing plate includes a plurality of portions, each having light transmission easy axes arranged with axial symmetry and forms one polarizing element, and the plurality of portions are arranged in a regular manner.

3. A liquid crystal display device including an axial symmetric polarizing plate according to claim 1, wherein the at least one portion forms at least one polarizing element, and the at least one polarizing element corresponds to a plurality of pixels forming an image display screen.

4. A liquid crystal display device including an axial symmetric polarizing plate according to claim 2, wherein each of the plurality of portions where light transmission easy axes are arranged with axial symmetry form one polarizing element, and a plurality of polarizing elements correspond to one pixel forming an image display screen.

5. A liquid crystal display device comprising the axial symmetric polarizing plates according to claim 1 disposed on an upper surface and a lower surface of a liquid crystal layer, wherein the portion of each of the axial symmetric polarizing plates where light transmission easy axes are arranged with axial symmetry forms one polarizing element, the orientations of liquid crystal molecules of the polymerized liquid crystal material are the same in a pair of polarizing elements of the upper and lower axial symmetric polarizing plates opposing each other via the liquid crystal layer, and the dichroic dye contained in one of the axial symmetric polarizing plates is of a p-type, while the dichroic dye contained in the other axial symmetric polarizing plate is of an n-type.

6. A liquid crystal display device comprising the axial symmetric polarizing plates according to claim 1 disposed on an upper surface and a lower surface of a liquid crystal layer, wherein the portion of each of the axial symmetric polarizing plates where light transmission easy axes are arranged with axial symmetry forms one polarizing element, and in one of a pair of polarizing elements of the upper and lower axial symmetric polarizing plates opposing each other via the liquid crystal layer, light transmission easy axes are arranged concentrically, while in the other polarizing elements, light transmission easy axes are arranged radially.

7. A liquid crystal display device comprising the axial symmetric polarizing plates according to claim 1 disposed on an upper surface and a lower surface of a liquid crystal layer, wherein the portion of each of the axial symmetric polarizing plates where light transmission easy axes are arranged with axial symmetry forms one polarizing element, in one of a pair of polarizing elements of the upper and lower axial symmetric polarizing plates opposing each other via the liquid crystal layer, light transmission easy axes are arranged in a clockwise spiral shape, while in the other polarizing element, light transmission easy axes are arranged in a counterclockwise spiral shape, and the light transmission easy axes of one of the pair of polarizing elements and the light transmission easy axes of the other polarizing element are perpendicular to each other.

* * * * *